US012567574B2

(12) United States Patent
Gaben

(10) Patent No.: US 12,567,574 B2
(45) Date of Patent: Mar. 3, 2026

(54) METHOD FOR MANUFACTURING AN ASSEMBLY COMPRISING A SEPARATOR AND POROUS ELECTRODE, AN ASSEMBLY COMPRISING A SEPARATOR AND POROUS ELECTRODE, AND ELECTROCHEMICAL DEVICE CONTAINING SUCH AN ASSEMBLY

(71) Applicant: I-TEN, Dardilly (FR)

(72) Inventor: Fabien Gaben, Dardilly (FR)

(73) Assignee: I-TEN, Dardilly (FR)

( * ) Notice: Subject to any disclaimer, the term of this patent is extended or adjusted under 35 U.S.C. 154(b) by 661 days.

(21) Appl. No.: 17/996,347

(22) PCT Filed: Apr. 28, 2021

(86) PCT No.: PCT/IB2021/053500

§ 371 (c)(1),
(2) Date: Oct. 16, 2022

(87) PCT Pub. No.: WO2021/220177

PCT Pub. Date: Nov. 4, 2021

(65) Prior Publication Data

US 2023/0261167 A1     Aug. 17, 2023

(30) Foreign Application Priority Data

Apr. 28, 2020    (FR) ...................................... 2004195

(51) Int. Cl.
*H01M 4/04*          (2006.01)
*H01M 4/139*        (2010.01)
*H01M 10/058*      (2010.01)
(52) U.S. Cl.
CPC ......... *H01M 4/0404* (2013.01); *H01M 4/139* (2013.01); *H01M 10/058* (2013.01)
(58) Field of Classification Search
CPC ... H01M 4/0404; H01M 4/139; H01M 10/058
USPC ...................................................... 29/623.5
See application file for complete search history.

(56) References Cited

U.S. PATENT DOCUMENTS

| | | | | |
|---|---|---|---|---|
| 9,437,855 | B2 * | 9/2016 | Prochazka, Jr. ...... | H01M 4/625 |
| 2005/0003643 | A1 * | 1/2005 | Lindstrom ........... | H01G 9/2031 |
| | | | | 438/584 |
| 2019/0198883 | A1 * | 6/2019 | Yamamoto ........ | H01M 10/0525 |
| 2020/0343525 | A1 * | 10/2020 | Hu ........................ | H01M 4/621 |

FOREIGN PATENT DOCUMENTS

| | | | |
|---|---|---|---|
| CN | 101853931 | A | 10/2010 |
| FR | 2982084 | A1 | 5/2013 |
| FR | 3014425 | A1 | 6/2015 |
| FR | 3080862 | A1 | 11/2019 |
| FR | 3080945 | A1 | 11/2019 |
| KR | 10-2014-0096335 | A | 8/2014 |
| WO | 2019215407 | A1 | 11/2019 |

OTHER PUBLICATIONS

Li et al., "Highly dispersed pt nanoparticle catalyst prepared by atomic layer deposition," vol. 97, No. 1-2, (Jun. 9, 2010).
European Search Report for Application No. PCT/IB2021/053500, mailed Jul. 7, 2021, 3 pages.
Korea Intellectual Property Office Ofice Action for KR10-2022-7041819, dated Aug. 6, 2025.

* cited by examiner

*Primary Examiner* — James M Erwin
(74) *Attorney, Agent, or Firm* — Jordan IP Law, LLC; Todd A. Vaughn

(57) ABSTRACT

A method for manufacturing an electrochemical device that may be selected from the group consisting of: lithium ion batteries with a capacity greater than 1 mAh, capacitors, supercapacitors, resistors, inductors, transistors, photovoltaic cells, fuel cells, implementing a method for manufacturing an assembly comprising a porous electrode and a porous separator comprising a porous layer deposited on a substrate having a porosity comprised between 20% and 60% by volume, and pores with an average diameter of less than 50 nm.

19 Claims, No Drawings

METHOD FOR MANUFACTURING AN ASSEMBLY COMPRISING A SEPARATOR AND POROUS ELECTRODE, AN ASSEMBLY COMPRISING A SEPARATOR AND POROUS ELECTRODE, AND ELECTROCHEMICAL DEVICE CONTAINING SUCH AN ASSEMBLY

CROSS-REFERENCE TO RELATED APPLICATION

The present application is a National Stage Application of PCT International Application No. PCT/IB2021/053500 (filed on Apr. 28, 2021), under 35 U.S.C. § 371, which claims priority to French Patent Application No. FR 2004195 (filed on Apr. 28, 2020), which are each hereby incorporated by reference in their complete respective entireties.

TECHNICAL FIELD

The invention relates to the field of electrochemistry, and more particularly to electrochemical systems. It relates more specifically to the porous electrode/separator assemblies that can be used in electrochemical devices such as high-power batteries (including lithium-ion batteries) with a capacity greater than 1 mAh, sodium ion batteries, lithium-air batteries, fuel cells, and photovoltaic cells. The invention applies to negative electrodes and positive electrodes. These porous electrode/separator assemblies can be impregnated with a solid electrolyte without liquid phase or liquid electrolyte.

The invention also relates to a method for preparing such a porous electrode/separator assembly which implements nanoparticles of an electrode material and nanoparticles of an inorganic material which will constitute the separator, and the porous electrode/separator assemblies thus obtained. The invention also relates to a method for manufacturing an electrochemical device comprising at least one of these assemblies, and the devices thus obtained; these devices are in particular lithium ion batteries.

BACKGROUND

The ideal battery for powering autonomous electrical devices (such as: portable telephones and computers, portable tools, autonomous sensors) or for the traction of electric vehicles would have a high service life, would be able to store both large quantities of energy and power, and would not have the risk of overheating or even exploding.

Currently, these electrical devices are essentially powered by lithium-ion batteries, which have the best energy density of the different proposed storage technologies. There are various architectures and chemical electrode and separator compositions to produce these batteries. The methods for manufacturing lithium-ion batteries are presented in many articles and patents; an inventory is given in the book "Advances in Lithium-ion batteries" (ed. W. van Schalkwijk and B. Scrosati), published in 2002 (Kluever Academic/Plenum Publishers).

The electrodes of the lithium-ion batteries can be manufactured using coating techniques, in particular by roll coating, doctor blade coating, tape casting, slot-die coating. With these methods an ink consisting of particles of active materials in the form of powder is deposited on the surface of a substrate; the particles constituting this powder have an average particle size which is typically between 5 μm and 15 μm in diameter.

These techniques allow to produce layers of a thickness comprised between approximately 50 μm and approximately 400 μm. The power and energy of the battery can be modulated by adapting the thickness and porosity of the layers, and the size of the active particles that constitute them.

Inks (or pastes) deposited to form the electrodes contain active material particles, but also (organic) binders, carbon powder allowing to ensure electrical contact between particles, and solvents that are evaporated during the step of drying the electrodes. To improve the quality of electrical contacts between the particles and to compact the deposited layers, a calendering step is performed on the electrodes. After this compression step, the active particles of the electrodes occupy about 50% to 70% of the volume of the deposition, which means that there is usually about 30% to 50% of porosities between the particles.

To best optimise the density of volume energy of lithium-ion batteries produced with conventional manufacturing methods, it can be extremely useful to reduce the porosity of the electrodes; thus, the amount of active ingredient is increased per electrode volume unit. This can be done in many ways.

In the extreme, completely dense layers, devoid of porosity can be used; thus the density of volume energy of the electrode is maximum. Such dense layers can be produced using vacuum deposition techniques, for example by Physical Vapour Deposition (abbreviated PVD). However, since these layers devoid of pores (layers called "fully solid layers") cannot contain a liquid electrolyte to facilitate the ionic transport or electronic conductive fillers to facilitate the transport of electrical charges, their thickness in a battery must remain limited to a few micrometres, because otherwise they would become too resistive. These deposition techniques are used for the manufacturing of microbatteries.

It is also possible to optimise conventional inking techniques to increase the density of layers obtained after calendering. It has been shown that by optimising the size distribution of the deposited particles it is possible to reach a density of the layer of 70% (see the publication of J. Ma and L. C. Lim, "*Effect of particle size distribution of sintering of agglomerate-free submicron alumina powder compacts*", published in 2002 in J. Europ. Ceramic Soc. 22 (13), p. 2197-2208). It can be estimated that an electrode having 30% porosity, containing conductive fillers and impregnated with a lithium-ion conductive electrolyte, would have a higher volume energy density of about 35% compared to the same electrode with 50% porosity consisting of particles which are monodispersed in size. Moreover, because of the impregnation by highly ion conductive phases and the addition of electronic conductors, the thickness of these electrodes can be very much increased compared to what is possible to do with the techniques of vacuum deposition, which lead to compact but more resistive layers. This increase in the thickness of the electrodes increases the energy density of the battery cells thus obtained.

However, although allowing to increase the energy density of the electrodes, such a size distribution of the active material particles is not without problems. Particles of different sizes in an electrode will have different capacities. Under the effect of identical charge and/or discharge currents they will be locally more or less charged and/or discharged according to their size. When the battery will no longer be subjected to current, the local charge states between particles will be balanced again, but during the transient phases, local imbalances can lead to locally stressing the particles outside their stable voltage ranges. These local charge imbalances will be all the more pronounced as the current density will be significant. These imbalances therefore induce a loss of cycling performance, a safety risk and a limitation of the power of the battery cell. The same goes when the electrodes have non-homogenous porosity, namely distributed in size; this non-homogeneity contributes to making the wetting of the pores of the electrodes more difficult.

These effects of the particle size distribution of the active material particles on the current/voltage relationships of the electrodes were studied by numerical simulation in the publication "*A study on the Effect of Porosity and Particle Size Distribution On Li-Ion Battery Performance*" by S. T. Taleghani and al., published in 2017 in the journal j. Electrochem. Soc. 164 (11), p. E3179-E3189).

According to the prior art, active material particles with a size typically comprised between 5 μm and 15 μm are used with the techniques for inking the electrodes mentioned above. The contact between each of the particles is essentially punctual, and the particles are bound together with an organic binder which is in most cases polyvinylidene fluoride (abbreviated PVDF).

Fully ceramic mesoporous electrode layers for lithium-ion batteries can be deposited by electrophoresis; this is known from WO 2019/215 407 (I-TEN). They can be impregnated with a liquid electrolyte, but their electrical resistivity remains quite high.

Liquid electrolytes used for impregnating porous electrodes consist of aprotic solvents wherein lithium salts were dissolved. They are very flammable and can give rise to violent combustions of battery cells, especially when the active cathode materials are subjected to voltage ranges outside their stability voltage range, or when hot spots appear locally in the cell.

To find a solution to these safety problems inherent in the structure of lithium-ion battery cells, one can work along three axes.

According to a first axis, the organic solvent-based electrolytes can be replaced by ionic liquids, which are extremely temperature-stable. However, the ionic liquids do not wet the surfaces of the organic materials, and the presence of PVDF and other organic binders in the conventional lithium-ion battery electrodes prevents anchoring electrodes from being wet by this type of electrolyte; the performance of the electrodes is impacted. Ceramic separators have been developed to solve this problem at the electrolytic junction between electrodes, but the fact remains that the presence of organic binders in the electrodes continues to cause problems for the use of ionic liquid-based electrolytes.

According to a second axis, it can be sought to homogenise particle sizes, in order to avoid local imbalances of charge states that can lead during intensive discharges to locally stress active materials outside their operating voltage ranges. This optimisation would then be at the expense of the energy density of the cell.

According to a third axis, the distribution and division of conductive fillers (usually carbon black) can be homogenised in the electrode, in order to avoid locally having more electrically resistive areas that could lead to the formation of a hot spot during the battery power operation.

As regards more particularly the methods for manufacturing battery electrodes according to the prior art, their manufacturing cost depends in part on the nature of the solvents and inks used. In addition to the intrinsic cost of the active materials, the cost of manufacturing the electrodes results essentially from the complexity of the inks used (binders, solvents, carbon black). The main solvent used for the production of lithium-ion battery electrodes is N-methyl-2-pyrrolidone (abbreviated NMP). NMP is an excellent solvent for dissolving PVDF which acts as a binder in the formulation of inks.

The drying of the NMP contained in the electrodes is a real economic issue. The high boiling temperature of the NMP coupled to its very low vapour pressure makes its drying difficult to achieve in an industrial environment. Solvent vapours should be collected and reprocessed. Moreover, to ensure better adhesion of the electrodes to the substrates, the drying temperature of the NMP should not be too high, which tends to increase the drying time and its cost once again; this is described in the publication "Technical and economic analysis of solvent-*based lithium-ion electrode drying with water and NMP*" by D. L. Wood & al., published in the journal Drying Technology, vol. 36, n°2 (2018).

Other less expensive solvents can be used to produce inks, in particular water and ethanol. However, their surface tension is greater than that of the NMP, and therefore they wet the surface of the metal power collectors less well. In addition, the particles tend to agglomerate in water, especially carbon black nanoparticles. These agglomerations lead to a heterogeneous distribution of the components entering into the composition of the electrode (binders, carbon black . . . ). In addition, whether with water or ethanol, traces of water can remain adsorbed on the surface of the particles of active materials, even after drying.

Finally, in addition to the problems related to the formulation of the inks to obtain a low-cost efficient electrode, it must be borne in mind that the ratio between the energy density and the power density of the electrodes can be adjusted according to the particle size of the active materials, and indirectly to the porosity of the electrode layers and their thickness. The article by J. Newman ("Optimisation of Porosity and Thickness of a Battery Electrode by Means of a Reaction-Zone Model", J. Electrochem. Soc., 142 (1), p. 97-101 (1995)) demonstrates the respective effects of the thicknesses of the electrodes and their porosity on their discharge (power) regime and energy density.

Moreover, when it is desired to manufacture a battery cell, it is known to position a separator between the electrodes. The electrodes and the separator of each elementary cell are typically impregnated with a liquid electrolyte. The separators used in lithium-ion batteries are most often polymer membranes whose pores are impregnated with a liquid electrolyte containing lithium salts such as LiPF6. The fact that these separators are in polymeric form poses problems of wettability of ionic liquids. Surface treatments can be carried out on these separators, or mineral fillers can be integrated within these separators in order to increase their mechanical strength and their wetting property with respect to ionic liquids.

For mechanical strength, these separators typically have thicknesses of the order of 25 micrometres. They must withstand energisation during the manufacturing steps of the battery cells. For this purpose, they generally consist of several layers of polymers. These are essentially layers of polyethylene (PE) and polypropylene (PP) which respectively provide safety functions, in particular closing the porosity in the event of local overheating, and mechanical functions.

These separators are provided with a microporosity which can be impregnated with an electrolyte and thus ensure the migration of ions. During the use of the battery, lithium dendrites may be formed in the thickness of the separator, which creates the risk of thermal runaway. Conductive carbon black nanoparticles can also detach from the electrodes, enter the separator and thus create a risk of an internal short circuit. These risks can be exacerbated by the presence of defects in the separator.

Moreover, the great thickness of the separators decreases the energy and power density of the battery containing them. The thicker the separator, the greater the ionic resistance between the negative electrode and the positive electrode. Moreover, the volume occupied by the separator does not store energy; the smaller the thickness of the separator, the better the specific energy density of the elementary cell of the battery.

In order to reduce these safety risks and this decrease in battery performance, solid electrolytes, most often in the form of polymers, have been developed. These solid electrolytes are deposited directly on the electrodes and their thickness can be reduced; thus the question of their rigidity to remain intact during the cell manufacturing method no longer arises.

However, the risk of dendrite formation in solid electrolytes is not completely resolved. Indeed, even in the absence of liquid electrolytes, dendrites can be formed in solid electrolytes. This formation is more likely as the solid electrolyte will be poorly electrically insulating and the electrolyte material will be lithiophobic.

When the solid electrolyte is in the form of a polymer, the absence of liquid electrolytes dissolved in the polymer (solvated or in the form of an ionic liquid at room temperature) allows to limit or even prevent the appearance of dendrites.

The risk of the appearance of lithium dendrites is mainly present when the operating potential of the negative electrode is low. The negative electrodes based on titanates, operating at potentials of the order of 1.5 V do not have a risk of lithium dendrites forming during the recharging of the battery. These negative electrodes are also particularly well adapted for applications requiring rapid recharging.

To overcome these various problems, layers of solid, ceramic, mesoporous electrolytes the pores of which can be impregnated with a liquid electrolyte such as an ionic liquid have been developed; this is known from WO 2019/215 411 (I-TEN). These electrolytes are particularly well adapted to be used with a negative electrode operating at a relatively high insertion potential, because in this way there is no risk of lithium dendrites forming. Moreover, these electrolytes use ceramic nanoparticles which are stable over a wide range of potential and are particularly rigid. They can thus be thinly deposited on the lithium-ion battery electrodes and allow very high energy and power densities to be obtained.

During their manufacture, these solid, ceramic, mesoporous electrolyte layers are sintered in the presence of air. The heat treatment used allows to calcine the organic residues (solvents and/or stabilisers and/or binders used in the suspensions of nanoparticles) that they contain while preventing these organic residues from being transformed into a thin layer of carbon which would harm the electrical insulation, in particular by short-circuiting the electrodes of opposite polarities. After this heat treatment, the inorganic separator obtained can easily be impregnated with a liquid electrolyte (solvated and/or an ionic liquid at room temperature). It is particularly well adapted to ceramic electrodes which can withstand heat treatments.

On the other hand, for the production of battery cells with very high energy density, it is advisable to use negative electrodes inserting lithium at the lowest possible potential.

In order to prevent the formation of dendrites on such very energetic cells, other electrolytes have been developed and described in application WO 2019/215 410 (I-TEN). These electrolytes have a homogeneous composite structure comprising a solid electrolyte/PEO volume ratio greater than 35%. This architecture allows to produce solid electrolytes, without risk of formation of lithium dendrites with good ionic conductivity, without lithium salts in the PEO.

SUMMARY

The problem that the present invention seeks to overcome is to provide a porous electrode/separator assembly for a lithium-ion battery provided with an electrode having a very high energy density coupled with a very high power density and with a separator having a stable mechanical structure as well as a good thermal stability, which is able to operate reliably and which has excellent cycle life as well as an increased safety.

Another problem that the present invention seeks to solve is to provide a method for manufacturing such a porous electrode/separator assembly which is simple, safe, rapid, easy to implement, easy to industrialise and inexpensive.

Another purpose of the invention is to provide a method for manufacturing a battery comprising a porous electrode/separator assembly according to the invention.

Another purpose of the invention is to provide a rigid structure battery having a long life, having a high power density, having increased reliability and capable of mechanically withstanding shocks and vibrations.

The present invention applies to assemblies consisting of a porous electrode and a porous separator. Said separator can serve as a host structure to accommodate an ion-conductive electrolyte; said ion-conductive electrolyte can also invade said porous electrode.

To overcome the safety problems inherent in the structure of conventional lithium-ion battery cells, the inventors followed three guidelines.

According to a first guideline, organic solvent-based electrolytes are replaced by mixtures of organic solvents and ionic liquids or by ionic liquids, which are extremely temperature-stable. However, the ionic liquids do not wet on the surfaces of organic materials and the presence of PVDF and other organic binders in conventional battery electrodes prevents wetting of the electrodes by this type of electrolyte, and the performance of the electrodes is affected. Ceramic separators have been developed to solve this problem at the electrolytic junction between electrodes, but the fact remains that the presence of organic binders in the electrodes continues to pose problems for the use of electrolytes based on ionic liquids.

According to a second guideline, it is sought to homogenise the sizes of particles, in order to avoid local imbalances of states of charge which can lead during intensive discharges to locally stress active materials outside their conventional operating voltage ranges.

According to a third guideline, it is sought to homogenise the distribution and division of conductive additives ("conductive fillers"; only carbon black is used in practice) in the electrode, in order to avoid locally having more electrically resistive areas that could lead to the formation of a hot spot during the battery power operation.

According to the invention, the problem is solved by an assembly consisting of a porous electrode and a separator for a lithium-ion battery which is totally porous, preferably mesoporous, devoid of organic binders, and the porosity of which is comprised between 25 and 50%, and the size of the channels and pores of which is homogeneous, within the assembly, in order to ensure a perfect dynamic balancing of the cell.

The porosities, expressed in relative pore volume, of the electrodes and of the separator may be the same or may be different; they are preferably different. This can be achieved by thermal consolidation in two steps, one for the electrode, which is deposited before the separator, the other for the electrode-separator assembly. The porosity of the electrode is advantageously comprised between 25% and 35% to optimise the energy density, that of the separator between 40% and 60% (and preferably between 45% and 55%) to optimise the ionic conduction. In a particularly advantageous embodiment of the invention, the porosity of the electrode is about 30% and that of the separator is about 50%. Below a value of 25%, impregnation becomes difficult and remains incomplete because the porosities can be at least partially closed.

The porous structure, preferably mesoporous structure, fully solid, without organic components, of the porous electrode, respectively of the separator, is obtained by the deposition, on a substrate, of agglomerates and/or aggregates of nanoparticles of active electrode materials P, respectively of inorganic material E to form the separator. The sizes of the primary particles constituting these agglomerates and/or aggregates are in the range of the nanometre or tens of nanometres, and said agglomerates and/or aggregates contain at least four primary particles.

Said substrate may be, in a first embodiment, a substrate capable of acting as an electric current collector, or be, in a second embodiment, an intermediate, temporary substrate which will be explained in more detail below.

Using agglomerates of a few tens or even hundreds of nanometres in diameters rather than non-agglomerated primary particles each having a size in the range of the nanometre or tens of nanometres allows to increase the deposition thicknesses. The agglomerates must have a size less than 300 nm. The sintering of agglomerates greater than 500 nm would not allow to obtain a mesoporous continuous film. In this case, two sizes of different porosity are observed in the deposition, namely porosity between agglomerates and porosity inside the agglomerates.

Indeed, it is observed that during drying of the nanoparticle depositions on a substrate capable of acting as an electric current collector, cracks appear in the layer. It can be seen that the appearance of these cracks depends essentially on the size of the particles, the compactness of the deposition and its thickness. This limit thickness of cracking is defined by the following relationship:

$h_{max} = 0.41 \left[ (GMø_{rcp}R^3)/2\gamma \right]$, where $h_{max}$ designates the critical thickness, g the nanoparticle shear module, M the number of coordination, $ø_{rcp}$ the volume fraction of nanoparticles, R the radius of the particles and y the interfacial tension between the solvent and the air.

It follows that the use of agglomerates, which are mesoporous, consisting of primary nanoparticles at least ten times smaller than the size of the agglomerate, allows to considerably increase the limit thickness of cracking of the layers. In the same way, it is possible to add a few percent of a solvent with a lower surface tension (such as isopropyl alcohol (abbreviated IPA)) in water or ethanol to improve the wettability and the adhesion of the deposition, and to reduce the risk of cracking. In order to increase the deposition thicknesses while limiting or eliminating the appearance of cracks, it is possible to add binders, dispersants. These additives and organic solvents can be eliminated by heat treatment under air, such as debinding, during a sintering treatment or during a heat treatment carried out prior to the sintering treatment.

Moreover, for the same size of primary particles, it is possible during their synthesis by precipitation to modify the size of the agglomerates by modulating the amount of ligands (for example polyvinyl pyrrolidone, abbreviated PVP) in the synthesis reactor. Thus, it is possible to produce an ink containing agglomerates which are very dispersed in size or having two complementary size populations, so as to maximise the compactness of the deposition of agglomerates. Unlike the sintering of non-agglomerated nanoparticles, the sintering conditions between agglomerates of different sizes will not be changed. These are the primary nanoparticles, which constitute the agglomerates which will weld together. These primary nanoparticles have identical sizes regardless of the size of the agglomerate. The size distribution of the agglomerates will improve the compactness of the depositions and increase the points of contact between nanoparticles, but will not modify the consolidation temperature.

After partial sintering, a porous, preferably mesoporous, layer or a plate is obtained, without carbon black or organic compounds, wherein all the nanoparticles are welded together (by the necking phenomenon, which is also known).

The method for manufacturing a mesoporous deposition, as described above, was used to produce the porous electrode as well as the separator of the assembly consisting of a porous electrode and a separator according to the invention.

The porous, preferably mesoporous, layer thus obtained is entirely solid and ceramic. There is no longer any risk of loss of electrical contact between the particles of active materials during cycling, which is likely to improve the cycling performance of the battery. Moreover, after sintering, the electrode adheres perfectly to the metal substrate on which it has been deposited or transferred (in the case of an initial deposition on an intermediate substrate).

The heat treatments carried out at high temperature to sinter the nanoparticles together allow the electrode to dry perfectly and remove all traces of water or solvents or other organic additives (stabilisers, binders) adsorbed on the surface of the active material particles. The high temperature heat treatment (sintering) can be preceded by a lower temperature heat treatment (debinding) to dry the placed or deposited electrode and to remove traces of water or solvents or other organic additives (stabilisers, binders) adsorbed on the surface of the active material particles; this debinding can be carried out in an oxidising atmosphere.

Depending on the sintering times and temperature, it is possible to adjust the porosity of the final electrode. Depending on the energy density requirements, the latter can be adjusted within a range comprised between 50% to 25% porosity.

In all cases, the power density of the electrodes thus obtained remains extremely high due to the mesoporosity. Moreover, independently of the size of the mesopores in the active material (knowing that after sintering the notion of nanoparticle no longer applies to the material which then has a three-dimensional structure with a network of channels and mesopores), the dynamic cell balancing remains perfect, which helps to maximise power densities and battery cell lives.

The electrode of the assembly according to the invention has a high specific surface, which reduces the ionic resistance of the electrode. However, for this electrode to deliver maximum power, it must still have very good electronic conductivity to avoid ohmic losses in the battery. This improvement in the electronic conductivity of the cell will be all the more critical the greater the thickness of the electrode. Moreover, this electronic conductivity must be perfectly homogeneous throughout the electrode in order to avoid the local formation of hot spots.

According to the invention, a coating of an electronically conductive material is deposited on and inside the pores of the porous layer obtained from the active material. This electronically conductive material can be deposited by the Atomic Layer Deposition technique (abbreviated as ALD) or from a liquid precursor. Said electronically conductive material may be carbon. This deposition of an electronically conductive material is carried out only on the electrode and not on the separator.

To deposit a carbon layer from a liquid precursor, the mesoporous layer can be immersed in a solution which is rich of a carbon precursor (for example a sucrose solution). Then the electrode is dried and subjected to a heat treatment under nitrogen at a temperature sufficient to pyrolyze the carbon precursor. This forms a very thin coating of carbon over the entire internal surface of the electrode, which is perfectly distributed. This coating gives the electrode good electronic conduction, regardless of its thickness. It should be noted that this treatment is possible after sintering because the electrode is entirely solid, without organic residues, and withstands the thermal cycles imposed by the various heat treatments.

The separator of the assembly according to the invention is then obtained in accordance with the method for manufacturing a mesoporous deposition, as described above on the porous electrode of the assembly.

The separator thus obtained is fully solid, ceramic and has good mechanical strength. Moreover, after sintering, the deposition of the inorganic layer adheres perfectly to the porous electrode so as to form the assembly according to the invention.

The heat treatments carried out at high temperature to sinter the nanoparticles together allow the separator to dry perfectly and remove all traces of water adsorbed on the surface of the particles of inorganic material E which constitutes the separator. Depending on the sintering time and temperature, the porosity of the separator can be adjusted.

The assembly consisting of a porous electrode and a separator according to the invention can advantageously be assembled to an electrode or to another assembly according to the invention, so as to obtain a functional battery.

A first object of the invention is a method for manufacturing an assembly consisting of a porous electrode and a porous separator, in particular for an electrochemical device selected from the group formed by: lithium ion batteries with a capacity greater than 1 mAh, sodium ion batteries, lithium-air batteries, photovoltaic cells, fuel cells, said electrode comprising a porous layer deposited on a substrate, said layer being free of binder, having a porosity comprised between 20% and 60% by volume, preferably between 25% and 50%, and pores with an average diameter of less than 50 nm, said separator comprising a porous inorganic layer deposited on said electrode, said porous inorganic layer being free of binder, having a porosity comprised between 25% and 60% by volume, preferably between 30% and 50%, and pores with an average diameter of less than 50 nm, said manufacturing method being characterised in that:

(a) provision is made of a substrate, a first colloidal suspension comprising aggregates or agglomerates of monodisperse primary nanoparticles of at least one active electrode material P, of average primary diameter $D_{50}$ comprised between approximately 2 nm and 150 nm, preferably between approximately 2 nm and approximately 100 nm, preferably between 2 nm and approximately 60 nm, and even more preferably between 2 nm and 50 nm, said aggregates or agglomerates having an average diameter $D_{50}$ comprised between approximately 50 nm and approximately 300 nm (preferably between approximately 100 nm and approximately 200 nm), and a second colloidal suspension comprising aggregates or agglomerates of nanoparticles of at least one inorganic material E, having an average primary diameter $D_{50}$ comprised between approximately 2 nm and approximately 100 nm, preferably between approximately 2 nm and approximately 60 nm, said aggregates or agglomerates having an average diameter $D_{50}$ comprised between approximately 50 nm and approximately 300 nm (preferably between approximately 100 nm and approximately 200 nm);

(b) a layer is deposited from said colloidal suspension or paste provided in step (a) on at least one face of said substrate by a technique preferably selected from the group formed of: electrophoresis, a printing method, in particular the ink-jet printing or flexographic printing, and a coating method, in particular doctor blade coating, roll coating, curtain coating, dip-coating and extrusion slot-die coating;

(c) said layer obtained in step (b) is dried, where appropriate before or after having separated said layer from its intermediate substrate, then, optionally, said dried layer is heat treated, preferably under an oxidising atmosphere, and it is consolidated, by pressing and/or heating, to obtain a porous, preferably inorganic and mesoporous, layer;

(d) a coating of an electronically conductive material is deposited on and inside the pores of the porous layer, so as to form said porous electrode;

(e) a porous inorganic layer from said second colloidal suspension provided in step (a) is deposited on said porous electrode obtained in step (d), by a technique preferably selected from the group formed of: electrophoresis, a printing method, in particular ink-jet printing or flexographic printing, or a coating method, in particular doctor blade coating, roll coating, curtain coating, dip-coating and extrusion slot-die coating;

(f) said porous inorganic layer of the structure obtained in step (e) is dried, preferably under an air flow, and heat treatment is carried out under air at a temperature below 500° C., preferably at approximately 400° C. in order to obtain said assembly consisting of a porous electrode and a porous separator, knowing that said substrate may be a substrate capable of acting as an electric current collector, or an intermediate substrate. Advantageously, after the heat treatment in step (f), said assembly consisting of a porous electrode and a separator is impregnated with an electrolyte, preferably a phase carrying lithium ions, selected from the group formed of:
an electrolyte composed of at least one aprotic solvent and at least one lithium salt;
an electrolyte composed of at least one ionic liquid or poly(ionic liquid) and at least one lithium salt;
a mixture of aprotic solvents and ionic liquids or poly(ionic liquids) and lithium salts;

a polymer made ionically conductive by adding at least one lithium salt; and a polymer made ionically conductive by adding a liquid electrolyte, either in the polymer phase or in the mesoporous structure.

Advantageously, after step d) the electrode obtained can be coated with an ionic conductive layer to improve the life of batteries and their performance. The ionic conductive layer may be $Li_{1.3}Al_{0.3}Ti_{1.7}(PO_4)_3$, nafion, $Li_3BO_3$, PEO, or else a mixture of PEO and a phase carrying lithium ions, such as lithium salts.

In step (b) the deposition may be carried out on one or both faces of the substrate.

Advantageously, when said substrate is an intermediate substrate, said layer is separated in step (c) from said intermediate substrate, to form, after consolidation, a porous plate. This separation step can be carried out before or after drying the layer obtained in step b).

Advantageously, when said substrate is an intermediate substrate, after step c) and before step d), provision is made of an electrically conductive sheet, covered on at least one face, preferably on its two faces, with a thin layer of conductive glue or a thin layer of nanoparticles of at least one active electrode material P, then at least one porous plate is glued on one face, preferably on each of the faces, of the electrically conductive sheet, so as to obtain a porous, preferably mesoporous, layer on a substrate capable of acting as a current collector.

Advantageously, when said colloidal suspension or paste provided in step (a) comprises organic additives, such as ligands, stabilisers, binders or residual organic solvents, said layer dried in step c) and/or said porous inorganic layer dried in step f) is heat treated, preferably under an oxidising atmosphere. This heat treatment, allowing debinding, can be carried out at the same time as the consolidation (sintering) when it is carried out under an oxidising atmosphere or before the step of consolidating the dried layer in step c).

In a first embodiment, said substrate is a substrate capable of acting as electric current collector. Said substrate on which said layer is deposited ensures in the electrode the function of current collector. Its chemical nature must be compatible with the temperature of the heat treatment of step (c) of the method for manufacturing the porous electrode (debinding and/or sintering heat treatments); in particular, it must not melt or form an oxide layer that would have too high electrical resistance, or react with electrode materials. Advantageously, a metal substrate is selected, which can in particular be made of tungsten, molybdenum, chromium, titanium, tantalum, stainless steel, or an alloy of two or more of these materials. Such metal substrates are quite expensive and can greatly increase the cost of the battery. This metal substrate can also be coated with a conductive or semiconductor oxide before depositing the layer of material P, which allows in particular to protect less noble substrates such as copper and nickel. The thickness of the layer after step (c) is advantageously comprised between approximately 1 μm and approximately 300 μm, preferably between 1 μm and 150 μm, more preferably between 10 μm and 50 μm, or else between 10 μm and 30 μm. When the substrate used is a substrate capable of acting as an electric current collector, the thickness of the layer after step (c) is limited in order to avoid any cracking problem.

In a second embodiment, said substrate is an intermediate, temporary substrate, such as a flexible substrate, which may be a polymer film. In this second embodiment, the deposition step is advantageously carried out on one face of said intermediate substrate in order to facilitate the subsequent separation of the layer from its substrate. In this second embodiment, the layer can be separated from its substrate after drying, preferably before heating it, but at the latest at the end of step (c). The thickness of the layer after step (c) is advantageously less than or equal to 5 mm, advantageously comprised between about 1 μm and about 500 μm. The thickness of the layer after step (c) is advantageously less than 300 μm, preferably, comprised between approximately 5 μm and approximately 300 μm, preferably between 5 μm and 150 μm.

Advantageously, said porous layer obtained at the end of step (c) has a specific surface comprised between approximately 10 m2/g and approximately 500 m2/g. Its thickness is advantageously comprised between 1 and 500 μm, preferably comprised between approximately 4 and approximately 400 μm.

The deposition obtained at the end of step (e) advantageously has a thickness comprised between approximately 3 μm and approximately 20 μm, and preferably between approximately 5 μm and approximately 10 μm.

Advantageously, said porous inorganic layer obtained at the end of step (f) has a specific surface comprised between approximately 10 m2/g and approximately 500 m2/g. Its thickness is advantageously comprised between 3 μm and 20 μm, and preferably between 5 μm and 10 μm.

The size distribution of the primary particles of the active material P and/or of the inorganic material E is preferably narrow. In a preferred manner, said agglomerates preferably comprise at least three primary particles. The size distribution of said agglomerates is preferably polydisperse. In one embodiment, the distribution of the agglomerate size is bimodal, that is to say that it has two size distribution peaks, these two sizes being called D1 and D2 where D1>D2; the ratio D2/D1 may be comprised for example between 3 and 7 and preferably between 4 and 6; this avoids the formation of large cavities and ensures a good compactness of the mesoporous layer.

The suspension of nanoparticles can be produced in water or in ethanol, or in a mixture of water and ethanol, or alternatively in a mixture of ethanol and isopropyl alcohol (with less than 3% of isopropyl alcohol). It does not contain carbon black.

To use either dip-coating or curtain coating techniques, the suspension is advantageously characterised by a dry extract of at least 15% and preferably at least 50%.

The deposition of said coating of electronically conductive material can be carried out by the atomic layer deposition ALD technique, or by immersion of the layer in a liquid phase including a precursor of said electronically conductive material, followed by the transformation of said precursor into electronically conductive material.

Said precursor is advantageously a carbon-rich compound, such as a carbohydrate, in particular a polysaccharide (for example sucrose, lactose, glucose), and said transformation into an electronically conductive material is in this case carried out by pyrolysis, preferably under an inert atmosphere (for example nitrogen). Said electronically conductive material may be carbon. It can be deposited in particular by ALD or by immersion in a liquid phase including a carbon precursor.

In said second embodiment, the method for manufacturing the battery porous electrode uses an intermediate polymer substrate (such as the PET) and results in a tape called "raw tape". This tape is then separated from its substrate; then it forms plates or sheets (hereinafter the term "plate" is used, regardless of its thickness). After cutting, these plates can be separated from their intermediate substrate. These plates are then calcined in order to remove the organic constituents. These plates are then sintered in order to consolidate the nanoparticles until a mesoporous ceramic structure is obtained with a porosity comprised between 25 and 50%. Said porous plate obtained in step (c) has a thickness advantageously less than or equal to 5 mm, preferably comprised between approximately 1 μm and approximately 500 μm. The thickness of the layer after step (c) is advantageously less than 300 μm, preferably, comprised between approximately 5 μm and approximately 300 μm, preferably between 5 μm and 150 μm. A coating of an electronically conductive material is then deposited on and inside the pores of the porous layer or porous plate, which is preferably mesoporous, as just described.

In this second embodiment, provision is also made of an electrically conductive sheet, covered on both faces with a thin intermediate layer of nanoparticles preferably identical to those constituting the electrode plate or covered on both faces with a thin layer of conductive glue. Said thin layers preferably have a thickness of less than 1 μm. This sheet can be a metal strip or a graphite sheet.

This electrically conductive sheet is then interposed between two plates of porous electrodes obtained previously, respectively between two porous plates obtained after step c). The assembly is then heat-pressed so that said intermediate nanoparticle thin layer is transformed by sintering and consolidates the electrode/substrate/electrode assembly, respectively the porous plate/substrate/porous plate assembly, to obtain a rigid and integral sub-assembly. During this sintering, the bond between the electrode layer, respectively the porous plate, and the intermediate layer is established by atom diffusion; this phenomenon is known by "diffusion bonding". This assembly is produced with two electrode plates, respectively two porous plates, of the same polarity (typically between two anodes or between two cathodes), and the metal sheet between these two electrode plates, respectively two porous plates, of the same polarity establishes a parallel connection therebetween.

One of the advantages of the second embodiment is that it allows the use of inexpensive substrates such as aluminium strips, copper or graphite strips. Indeed, these strips would not withstand the heat treatments for consolidating the deposited layers; gluing them to the electrode plates after their heat treatment also helps prevent their oxidation.

According to another variant of the second embodiment, when a porous plate/substrate/porous plate assembly is obtained, the coating of an electronically conductive material can then advantageously be deposited on and inside the pores of the porous, preferably mesoporous, plates, of the porous plate/substrate/porous plate assembly, as has been described previously, in particular when the used porous plates are thick.

The deposition of said coating of electronically conductive material can be carried out by the atomic layer deposition ALD technique, or by immersion of the porous layer in a liquid phase including a precursor of said electronically conductive material, followed by the transformation of said precursor into an electronically conductive material.

This "diffusion bonding" assembly can be carried out separately as has just been described, and the electrode/substrate/electrode sub-assemblies thus obtained can be used to manufacture a battery. This diffusion bonding assembly can also be achieved by stacking and heat-pressing the entire battery structure; in this case, a multilayer stack comprising a first porous anode layer, its metallic substrate, a second porous anode layer, a solid electrolyte layer, a first cathode layer, its metallic substrate, a second cathode layer, a new solid electrolyte layer, and so on, is assembled.

More specifically, electrode plates, which are mesoporous ceramic can either be glued on both faces of a metal substrate (then the same configuration as that resulting from the depositions on both faces of a metal substrate is found).

This electrode/substrate/electrode sub-assembly can be obtained by gluing the electrode plates to an electrically conductive sheet capable of subsequently acting as an electric current collector, or by depositing then sintering layers on a substrate capable of acting as an electric current collector, in particular a metal substrate.

Regardless of the embodiment of the electrode/substrate/electrode sub-assembly, the electrolyte film (separator) is then deposited on the latter.

The necessary cuts to produce a battery with several elementary cells can be made before the deposition on each electrode/substrate/electrode sub-assembly of an electrolyte film (separator), then the sub-assemblies are stacked (typically in "head to tail" mode) and the thermocompression is carried out to weld the electrodes together at the electrolyte film (separator).

The thermocompression welding takes place at a relatively low temperature, which is possible thanks to the very small size of the nanoparticles. As a result, oxidation of the metal layers of the substrate is not observed.

In other embodiments of the assembly, which will be described below, use is made of a conductive glue (loaded with graphite) or a sol-gel-type deposition loaded with conductive particles, or else metal strips, preferably having a low melting point (for example aluminium); during thermomechanical (heat pressing) treatment the metal strip can be deformed by creep and achieve this weld between the plates.

If the electrode should be used in a battery, an active material P which is dimensionally stable during the charge and discharge cycles is preferably selected. It may be particularly selected from the group formed of:

the oxides $LiMn_2O_4$, $Li_{1+x}Mn_{2-x}O_4$ with $0<x<0.15$, $LiCoO_2$, $LiNiO_2$, $LiMn_{1.5}Ni_{0.5}O_4$, $LiMn_{1.5}Ni_{0.5-x}X_xO_4$ where X is selected from Al, Fe, Cr, Co, Rh, Nd, other rare earths such as Sc, Y, Lu, La, Ce, Pr, Pm, Sm, Eu, Gd, Tb, Dy, Ho, Er, Tm, Yb, and where $0<x<0.1$, $LiMn_{2-x}M_xO_4$ with M=Er, Dy, Gd, Tb, Yb, Al, Y, Ni, Co, Ti, Sn, As, Mg or a mixture of these elements and where $0<x<0.4$, $LiFeO_2$, $LiMn_{1/3}Ni_{1/3}Co_{1/3}O_2$, $LiNi_{0.8}Co_{0.15}Al_{0.05}O_2$, $LiAl_xMn_{2-x}O_4$ with $0≤x<0.15$, $LiNi_{1/x}Co_{1/y}Mn_{1/z}O_2$ with x+y+z=10;

$Li_xM_yO_2$ where $0.6≤y≤0.85$; $0≤x+y≤2$; and M is selected from Al, Ti, Cr, Mn, Fe, Co, Ni, Cu, Zn, Zr, Nb, Mo, Ru, Sn, and Sb or a mixture of these elements; $Li_{1.20}Nb_{0.20}Mn_{0.60}O_2$;

$Li_{1+x}Nb_yMe_zApO_2$ where Me is at least one transition metal selected from: Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs and Mt, and where $0.6<x<1$; $0<y<0.5$; $0.25≤z<1$; with A≠0 Me and A≠0 Nb, and $0≤p≤0.2$;

$Li_xNb_{y-a}N_aM_{z-b}PbO_{2-c}F_c$ where $1.2≤x≤1.75$; $0≤y<0.55$; $0.1<z<1$; $0≤a<0.5$; $0≤b<1$; $0≤c<0.8$; and where M, N, and P are each at least one of the elements selected from the group consisting of Ti, Ta, V, Cr, Mn, Fe, Co, Ni, Cu, Zn, Al, Zr, Y, Mo, Ru, Rh, and Sb;

$Li_{1.25}Nb_{0.25}Mn_{0.50}O_2$;      $Li_{1.3}Nb_{0.3}Mn_{0.40}O_2$; $Li_{1.3}Nb_{0.3}Fe_{0.40}O_2$;      $Li_{1.3}Nb_{0.43}Ni_{0.27}O_2$; $Li_{1.3}Nb_{0.43}Co_{0.27}O_2$; $Li_{1.4}Nb_{0.2}Mn_{0.53}O_2$;

$Li_xNi_{0.2}Mn_{0.6}O_y$ where $0.00 \leq x \leq 1.52$; $1.07 \leq y < 2.4$; $Li_{1.2}Ni_{0.2}Mn_{0.6}O_2$;

$LiNi_xCo_yMn_{1-x-y}O_2$ where $0 \leq x$ and $y \leq 0.5$; $LiNi_xCe_zCo_yMn_{1-x-y}O_2$ where $0 \leq x$ and $y \leq 0.5$ and $0 \leq z$;

phosphates $LiFePO_4$, $LiMnPO_4$, $LiCoPO_4$, $LiNiPO_4$, $Li_3V_2(PO_4)_3$; $Li_2MPO_4F$ with M=Fe, Co, Ni or a mixture of these different elements, $LiMPO_4F$ with M=V, Fe, T or a mixture of these different elements; the phosphates of formula $LiMM'PO_4$, with M and M' (M≠M') selected from Fe, Mn, Ni, Co, V such as the $LiFe_xCo_{1-x}PO_4$ and where $0 < x < 1$;

oxyfluorides of the type $Fe_{0.9}Co_{0.1}OF$; $LiMSO_4F$ with M=Fe, Co, Ni, Mn, Zn, Mg; and all lithiated forms of the following chalcogenides: $V_2O_5$, $V_3O_8$, $TiS_2$, titanium oxysulfides ($TiO_yS_z$ with z=2−y and $0.3 \leq y \leq 1$), tungsten oxysulfides ($WO_yS_z$ with $0.6 < y < 3$ and $0.1 < z < 2$), CuS, $CuS_2$, preferably $Li_xV_2O_5$ with $0 < x \leq 2$, $Li_xV_3O_8$ with $0 < x \leq 1.7$, $Li_xTiS_2$ with $0 < x \leq 1$, titanium and lithium oxysulfides with $Li_xTiO_yS_z$ with z=2−y, $0.3 \leq y \leq 1$ and $0 < x \leq 1$, $Li_xWO_yS_z$ with z=2−y, $0.3 \leq y \leq 1$ and $0 < x \leq 1$, $Li_xCuS$ with $0 < x \leq 1$, $Li_xCuS_2$ with $0 < x \leq 1$.

A porous layer according to the invention, made with one of these materials, can ensure the positive electrode function in a battery, and in particular in a lithium-ion battery.

Said material P can also be selected from the group formed of:

$Li_4Ti_5O_{12}$, $Li_4Ti_{5-x}M_xO_{12}$ with M=V, Zr, Hf, Nb, Ta and $0 \leq x \leq 0.25$;

niobium oxides and mixed niobium oxides with titanium, germanium, cerium or tungsten, and preferably from the group formed of:

$Nb_2O_{5\pm\delta}$, $Nb_{18}W_{16}O_{93\pm\delta}$, $Nb_{16}W_5O_{55\pm\delta}$ with $0 \leq x \leq 1$ and $0 \leq \delta \leq 2$, $LiNbO_3$;

$TiNb_2O_{7\pm\delta}$, $Li_wTiNb_2O_7$ with $w \geq 0$, $Ti_{1-x}M^1_xNb_{2-y}M^2_yO_{7\pm\delta}$ or $Li_wTi_{1-x}M^1_xNb_{2-y}M^2_yO_{7\pm\delta}$, where $M^1$ and $M^2$ are each at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs and Sn, $M^1$ and $M^2$ can be identical or different from each other, and where $0 \leq w \leq 5$ and $0 \leq x \leq 1$ and $0 \leq y \leq 2$ and $0 \leq \delta \leq 0.3$;

$M_xTi_{1-2x}Nb_{2+x}O_{7\pm\delta}$, where M is an element whose degree of oxidation is +III, more particularly M is at least one of the elements selected from the group consisting of Fe, Ga, Mo, Al, B, and where $0 < x \leq 0.20$ and $-0.3 \leq \delta \leq 0.3$; $Ga_{0.10}Ti_{0.80}Nb_{2.10}O_7$; $Fe_{0.10}Ti_{0.80}Nb_{2.10}O_7$;

$M_xTi_{2-2x}Nb_{10+x}O_{29\pm\delta}$, where M is an element whose degree of oxidation is +III, more particularly M is at least one of the elements selected from the group consisting of Fe, Ga, Mo, Al, B, and where $0 < x \leq 0.40$ and $-0.3 \leq \delta \leq 0.3$;

$Ti_{1-x}M^1_xNb_{2-y}M^2_yO_{7-z}M^3_z$ or $Li_wTi_{1-x}M^1_xNb_{2-y}M^2_yO_{7-z}M^3_z$ where $M^1$ and $M^2$ are each at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs and Sn, $M^1$ and $M^2$ can be identical or different from each other, $M^3$ is at least one halogen, and where $0 \leq w \leq 5$ and $0 \leq x \leq 1$ and $0 \leq y \leq 2$ and $z \leq 0.3$;

$TiNb_2O_{7-z}M^3_z$ or $Li_wTiNb_2O_{7-z}M^3_z$ where $M^3$ is at least one halogen, preferably selected from F, Cl, Br, I or a mixture thereof, and $0 < z \leq 0.3$;

$Ti_{1-x}Ge_xNb_{2-y}M^1_yO_{7\pm z}$, $Li_wTi_{1-x}Ge_xNb_{2-y}M^1_yO_{7\pm z}$, $Ti_{1-x}Ce_xNb_{2-y}M^1_yO_{7\pm z}$, $Li_wTi_{1-x}Ce_xNb_{2-y}M^1_yO_{7\pm z}$, where $M^1$ and $M^2$ are at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs and Sn; $0 \leq w \leq 5$ and $0 \leq x \leq 1$ and $0 \leq y \leq 2$ and $z \leq 0.3$;

$Ti_{1-x}Ge_xNb_{2-y}M^1_yO_{7-z}M^2_z$, $Li_wTi_{1-x}Ge_xNb_{2-y}M^1_yO_{7-z}M^2_z$, $Ti_{1-x}Ce_xNb_{2-y}M_yO_{7-z}M^2_z$, $Li_wTi_{1-x}Ce_xNb_{2-y}M^1_yO_{7-z}M^2_z$ where $M^1$ and $M^2$ are each at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs, Ce and Sn, $M^1$ and $M^2$ can be identical or different from each other, and where $0 \leq w \leq 5$ and $0 \leq x \leq 1$ and $0 \leq y \leq 2$ and $z \leq 0.3$;

$TiO_2$; and

LiSiTON.

A porous layer according to the invention, made with one of these materials, can ensure the negative electrode function in a battery, and in particular in a lithium-ion battery. For use as a negative electrode in a lithium-ion battery, a negative electrode material is advantageously used which has a lithium insertion potential greater than 1 V; this allows a very fast recharging of the battery.

The negative electrode can be made of titanate and/or mixed titanium oxides. Preferably, the electrodes of the assembly according to the invention are impregnated with an ionic liquid containing a lithium salt. When said ionic liquid includes sulphur atoms, the substrate, capable of acting as electric current collector is, preferably, a noble metal. Such a battery has the advantage of being able to operate at high temperature.

The inorganic material E advantageously comprises an electronically insulating material, preferably selected from:

$Al_2O_3$, $SiO_2$, $ZrO_2$, and/or a material selected from the group formed of lithiated phosphates, preferably selected from: lithiated phosphates of the NaSICON type, $Li_3PO_4$; $LiPO_3$; $Li_3Al_{0.4}Sc_{1.6}(PO_4)_3$ called "LASP"; $Li_{1+x}Zr_{2-x}Ca_x(PO_4)_3$ with $0 \leq x \leq 0.25$; $Li_{1+2x}Zr_{2-x}Ca_x(PO_4)_3$ with $0 \leq x \leq 0.25$ such as $Li_{1.2}Zr_{1.9}Ca_{0.1}(PO_4)_3$ or $Li_{1.4}Zr_{1.8}Ca_{0.2}(PO_4)_3$; $LiZr_2(PO_4)_3$; $Li_{1+3x}Zr_2(P_{1-x}Si_xO_4)_3$ with $1.8 < x < 2.3$; $Li_{1+6x}Zr_2(P_{1-x}B_xO_4)_3$ with $0 \leq x \leq 0.25$; $Li_3(Sc_{2-x}M_x)(PO_4)_3$ with M=Al or Y and $0 \leq x \leq 1$; $Li_{1+x}M_x(Sc)_{2-x}(PO_4)_3$ with M=Al, Y, Ga or a mixture of these three elements and $0 \leq x \leq 0.8$; $Li_{1+x}M_x(Ga_{1-y}Sc_y)_{2-x}(PO_4)_3$ with $0 \leq x \leq 0.8$; $0 \leq y \leq 1$ and M=Al and/or Y; $Li_{1+x}M_x(Ga)_{2-x}(PO_4)_3$ with M=Al and/or Y and $0 \leq x \leq 0.8$; $Li_{1+x}Al_xTi_{2-x}(PO_4)_3$ with $0 \leq x \leq 1$ called "LATP"; or $Li_{1+x}Al_xGe_{2-x}(PO_4)_3$ with $0 \leq x \leq 1$ called "LAGP"; or $Li_{1+x+z}M_x(Ge_{1-y}Ti_y)_{2-x}Si_zP_{3-z}O_{12}$ with $0 \leq x \leq 0.8$ and $0 \leq y \leq 1.0$ and $0 \leq z \leq 0.6$ and M=Al, Ga or Y or a mixture of two or three of these elements; $Li_{3+y}(Sc_{2-x}M_x)Q_yP_{3-y}O_{12}$ with M=Al and/or Y and Q=Si and/or Se, $0 \leq x \leq 0.8$ and $0 \leq y \leq 1$; or $Li_{1-x-y}M_xSC_{2-x}Q_yP_{3-y}O_{12}$ with M=Al, Y, Ga or a mixture of these three elements and Q=Si and/or Se, $0 \leq x \leq 0.8$ and $0 \leq y \leq 1$; or $Li_{1+x+y+z}M_x(Ga_{1-y}SC_y)_{2-x}Q_zP_{3-z}O_{12}$ with $0 \leq x \leq 0.8$, $0 \leq y \leq 1$, $0 \leq z \leq 0.6$ with M=Al and/or Y and Q=Si and/or Se; or $Li_{1+x}Zr_{2-x}B_x(PO_4)_3$ with $0 \leq x \leq 0.25$; or $Li_{1+x}M^3_xM_{2-x}P_3O_{12}$ with $0 \leq x \leq 1$ and $M^3$=Cr, V, Ca, B, Mg, Bi and/or Mo, M=Sc, Sn, Zr, Hf, Se or Si, or a mixture of these elements.

A porous layer according to the invention, made with one of these materials, can perform the function of a separator in a battery, and in particular in a lithium-ion battery.

Another object of the present invention is an assembly consisting of a porous electrode and a porous separator that can be obtained by the method for manufacturing an assembly consisting of a porous electrode and a porous separator according to the invention. This porous assembly is advantageously free of binder. Its porosity is preferably comprised between 20% and 60% by volume, and the average diameter of its pores is less than 50 nm. It may be intended to act as a positive electrode/separator assembly or as a negative electrode/separator assembly in an electrochemical device.

An electrode of the assembly according to the invention allows to produce a lithium-ion battery which has both a high energy density and a high power density. This performance is the resultant of a limited porosity (which increases the energy density), of a very high specific surface (which is favoured by the very small size of the primary particles of the electrode, and which leads to increasing the exchange surface, which decreases the ion resistance), of the absence of organic binder (the binder can locally hide lithium access to the surface of the active materials). According to an essential feature of the invention, a coating of an electronically conductive material is deposited on and inside the pores of the porous layer of active material constituting the electrode. This coating decreases the series resistance of the battery.

Still another object of the invention is the use of a method for manufacturing an assembly consisting of a porous electrode and a separator according to the invention for the manufacture of an assembly consisting of a porous electrode and a separator in electronic, electrical or electrotechnical devices. These devices are selected from the group formed by: lithium ion batteries with a capacity greater than 1 mAh, sodium ion batteries, lithium-air batteries, photovoltaic cells, fuel cells.

Still another object of the invention is a method for manufacturing a battery implementing the method for manufacturing an assembly consisting of a porous electrode and a separator according to the invention, or implementing an assembly consisting of a porous electrode and a separator according to the invention. Said battery is advantageously a lithium-ion battery. In particular, this method for manufacturing an assembly consisting of a porous electrode and a separator can be implemented to manufacture an assembly the porous electrode of which is a positive electrode or a negative electrode. This method for manufacturing a battery may comprise a step wherein said assembly consisting of a porous electrode and a separator is impregnated with an electrolyte, preferably a phase carrying lithium ions, selected from the group formed of:

an electrolyte composed of at least one aprotic solvent and at least one lithium salt;

an electrolyte composed of at least one ionic liquid or poly(ionic liquid) and at least one lithium salt;

a mixture of aprotic solvents and ionic liquids or poly (ionic liquids) and lithium salts;

a polymer made ionically conductive by adding at least one lithium salt; and a polymer made ionically conductive by adding a liquid electrolyte, either in the polymer phase or in the mesoporous structure.

Said ionic liquids can be salts molten at room temperature (these products are known under the designation RTIL, Room Temperature Ionic Liquid), or ionic liquids which are solid at room temperature. These ionic liquids which are solid at room temperature must be heated to be liquefied to impregnate the electrodes; they are solidified in the porous layer.

A final object of the invention is an electrochemical device selected from the group formed by: lithium ion batteries with a capacity greater than 1 mAh, sodium ion batteries, lithium-air batteries, photovoltaic cells, fuel cells, that can be obtained by the manufacturing method according to the invention.

DESCRIPTION

1. Definitions

As part of this document, the size of a particle is defined by its largest dimension. "Nanoparticle" means any particle or object of nanometric size having at least one of its dimensions less than or equal to 100 nm.

"Ionic liquid" means any liquid salt, capable of transporting electricity, being different from all the melted salts by a melting temperature below 100° C. Some of these salts remain liquid at room temperature and do not solidify, even at very low temperature. Such salts are called "ionic liquids at room temperature".

"Mesoporous" materials mean any solid that has within its structure pores called "mesopores" having an intermediate size between that of the micropores (width less than 2 nm) and that of the macropores (width greater than 50 nm), namely a size comprised between 2 nm and 50 nm. This terminology corresponds to that adopted by IUPAC (International Union for Pure and Applied Chemistry), which serves as a reference for the person skilled in the art. The term "nanopore" is therefore not used here, even if the mesopores as defined above have nanoscale dimensions within the meaning of the definition of the nanoparticles, knowing that the pores with a size smaller than that of the mesopores are called by the person skilled in the art "micropores."

A presentation of the concepts of porosity (and the terminology that has just been exposed above) is given in the article "*Texture des matériaux pulvérulents ou poreux*" by F. Rouquercol and al., published in the collection "*Techniques de l'Ingénieur*", treaty of Analysis and Characterisation, fascicle P 1050; this article also describes the techniques for characterising porosity, in particular the BET method.

Within the meaning of the present invention, "mesoporous layer" means a layer which has mesopores. As will be explained below, in these layers the mesopores contribute significantly to the total porous volume; this fact is translated by the term "mesoporous layer of mesoporous porosity greater than X % by volume" used in the description below, and applicable to the porous electrode and to the separator used in the assembly according to the invention.

The term "aggregate" means, according to the definitions of IUPAC a weakly bound assembly of primary particles. In this case, these primary particles are nanoparticles having a diameter that can be determined by transmission electron microscopy. An aggregate of aggregated primary nanoparticles can normally be destroyed (that is to say reduced to primary nanoparticles) to make the primary nanoparticles suspended in a liquid phase under the effect of ultrasound, according to a technique known to the person skilled in the art.

The term "agglomerate" means, according to the definitions of IUPAC, a strongly bound assembly of primary particles or aggregates.

2. Preparation of Suspensions of Nanoparticles

The method for preparing the porous electrodes and the separator according to the invention starts from a suspension of nanoparticles. It is preferable not to prepare these suspensions of nanoparticles from dry nanopowders. They can be prepared by grinding powders or nanopowders in the liquid phase, and/or using ultrasonic treatment to deagglomerate nanoparticles.

In another embodiment of the invention the nanoparticles are prepared in suspension directly by precipitation. The synthesis of nanoparticles by precipitation allows to obtain primary nanoparticles of very homogeneous size with a unimodal size distribution that is to say a very tight and monodisperse distribution, of good crystallinity and purity. The use of these very homogeneous nanoparticles and narrow distribution allows to obtain a porous structure of controlled and open porosity after deposition. The porous structure obtained after deposition of these nanoparticles has little, preferably no closed pores.

In an even more preferred embodiment of the invention the nanoparticles are prepared directly at their primary size by hydrothermal or solvothermal synthesis; this technique allows to obtain nanoparticles with a very narrow size distribution called "monodisperse nanoparticles". The size of these non-aggregated or non-agglomerated nanopowders/nanoparticles is called primary size. It is typically comprised between 2 nm and 150 nm. It is advantageously comprised between 10 nm and 50 nm, preferably between 10 nm and 30 nm; this promotes in subsequent method steps the formation of an interconnected mesoporous network, thanks to the phenomenon of "necking". The electronic and ionic conduction of the porous electrode according to the invention takes place thanks to the phenomenon of "necking" forming the interconnected mesoporous network.

In an advantageous embodiment, the suspension of monodisperse nanoparticles is carried out in the presence of ligands or organic stabilisers so as to avoid aggregation, or even the agglomeration of nanoparticles. Binders may also be added in the suspension of nanoparticles to facilitate the production of depositions or raw tapes, in particular thick depositions without cracks. Indeed, in the context of the present invention, it proves to be preferable to start from a suspension of non-agglomerated primary particles, within which the agglomeration is then induced or caused, rather than allowing the agglomeration of the primary particles to occur spontaneously at the stage of preparation of the suspension.

This suspension of monodisperse nanoparticles can be purified to remove any potentially interfering ions. Depending on the degree of purification it can then be specially treated to form aggregates or agglomerates of a controlled size. More specifically, the formation of aggregates or agglomerates can result from the destabilisation of the suspension caused in particular by ions, by the increase in the dry extract of the suspension, by changing the solvent of the suspension, by adding a destabilising agent. If the suspension has been completely purified it is stable, and ions are added to destabilise it, typically in the form of a salt; these ions are preferably lithium ions (preferably added in the form of LiOH).

If the suspension has not been completely purified the formation of aggregates or agglomerates can be done alone in a spontaneous way or by ageing. This way of proceeding is simpler because it involves fewer purification steps, but it is more difficult to control the size of aggregates or agglomerates. One of the essential aspects for the manufacture of electrodes and a separator of the assembly according to the invention consists in properly controlling the size of the primary particles of electrode materials P and/or of inorganic materials E and their degree of aggregation or agglomeration.

If the stabilisation of the suspension of nanoparticles occurs after the formation of agglomerates, they will remain in the form of agglomerates; the suspension obtained can be used to make mesoporous depositions.

It is this suspension of aggregates or agglomerates of nanoparticles which is then used to deposit by electrophoresis, by the ink-jet printing method, by flexographic printing, by doctor blade coating, by roll coating, by curtain coating, by extrusion slot-die coating, or by dip-coating, or else by tape casting the porous, preferably mesoporous, electrode layers, and the inorganic layers, that is to say the separator of the assembly according to the invention.

According to the observations of the applicant, with an average diameter of the aggregates or agglomerates of nanoparticles comprised between 80 nm and 300 nm (preferably between 100 nm to 200 nm), a mesoporous layer having an average diameter of mesopores comprised between 2 nm and 50 nm is obtained during the subsequent steps of the method.

The porous electrode layer, respectively the inorganic layer corresponding to the separator of the assembly according to the invention, can be deposited by the dip-coating method, by the ink-jet printing method, by roll coating, by curtain coating or by doctor blade coating, from a fairly concentrated suspension comprising aggregates or agglomerates of nanoparticles of the active material P, respectively of the inorganic material E.

For electrophoresis, use is made of a less concentrated suspension containing agglomerates of nanoparticles of the active material P, respectively of the inorganic material E to produce the porous electrode layer, respectively to produce the inorganic layer corresponding to the separator of the assembly according to the invention.

The methods for depositing aggregates or agglomerates of nanoparticles by electrophoresis, by the dip-coating method, by ink-jet, by roll coating, by curtain coating or by doctor blade coating are methods which are simple, safe that easy to implement and to industrialise and which allow to obtain a final homogeneous porous layer. Electrophoretic deposition is a technique which enables uniform deposition over large areas with high deposition rates. The coating techniques, in particular dip-coating, roll coating, curtain coating or doctor blade coating, allow to simplify the management of the baths compared to the electrophoretic deposition techniques. Ink-jet printing deposition allows for localised depositions.

Porous layers made of a thick layer or separators made of a thick layer can be made in one step by roll coating, curtain coating, slot die coating, or by doctor blade coating (that is to say using a doctor blade).

It is noted that colloidal suspensions in water and/or ethanol and/or IPA and mixtures thereof are more fluid than those obtained in the NMP. It is thus possible to increase the dry extract of the suspension of nanoparticle agglomerates. These agglomerates preferably have sizes of less than or equal to 200 nm and have polydisperse sizes, even with two populations with different sizes.

Compared to the prior art, the formulation of inks and pastes for the production of the electrodes is simplified. There is no more risk of carbon black agglomerates in the suspension when increasing dry extract.

The production of an assembly consisting of a porous electrode and a separator according to the invention will be presented below.

3. Deposition of Layers and their Consolidation

In general, a layer of a suspension of nanoparticles is deposited on a substrate, by any appropriate technique, and in particular by a method selected from the group formed of: electrophoresis, a printing method and preferably ink-jet printing or flexographic printing, a coating method and preferably doctor blade coating, roll coating, curtain coating, dip-coating, or slot-die coating. The suspension is typically in the form of an ink, that is to say a fairly fluid liquid, but can also have a pasty consistency. The deposition technique and the implementation of the deposition method must be compatible with the viscosity of the suspension, and vice versa.

The deposited layer will then be dried. The layer is then consolidated to obtain the desired mesoporous ceramic structure. This consolidation will be described below. It can be performed by heat treatment, by a heat treatment preceded by a mechanical treatment, and optionally by a thermomechanical treatment, typically a thermocompression. During this thermomechanical or heat treatment the electrode layer will be freed of any organic constituent and organic residue (such as the liquid phase of the suspension of the nanoparticles and any surfactant products): it becomes an inorganic (ceramic) layer. The consolidation of a plate is preferably carried out after its separation from its intermediate substrate, since the latter would risk being degraded during this treatment.

The deposition of the layers, their drying and their consolidation are likely to raise some problems which will be discussed now. These problems are partly linked to the fact that during the consolidation of the layers a shrinkage occurs which generates internal stresses.

3.1 Substrate Capable of Acting as a Current Collector

According to a first embodiment, the layers of electrodes are each deposited on a substrate capable of acting as an electric current collector. Layers including the suspension of nanoparticles or agglomerates of nanoparticles can be deposited on both faces, by the deposition techniques indicated above. The substrate serving as a current collector within batteries using porous electrodes according to the invention can be metallic, for example a metal strip (that is to say a rolled metal sheet). The substrate is preferably selected from strips of tungsten, molybdenum, chromium, titanium, tantalum, stainless steel, or an alloy of two or more of these materials. Less noble substrates such as copper or nickel may receive a conductive and protective coating against oxidation.

The metal sheet can be coated with a noble metal layer, in particular selected from gold, platinum, palladium, titanium or alloys containing mainly at least one or more of these metals, or a layer of ITO type conductive material (which has the advantage of acting as a diffusion barrier).

In general, this substrate capable of acting as an electric current collector must withstand the conditions of heat treatment of the deposited layer, and the operating conditions within the battery cell. As such, copper and nickel are suitable in contact with the anode material; they may oxidise the cathode.

Regarding the deposition of the layers, the electrophoresis method (especially in water) can be used. In this particular case, the substrate is subjected to an electrochemical polarisation which leads either to its oxidation or to its dissolution in the suspension of nanoparticles. In this case, only substrates which do not have anodisation and/or corrosion phenomena can be used. This is in particular the case with stainless steel and noble metals.

When the deposition of nanoparticles and/or agglomerates is carried out by one of the other techniques mentioned below (such as coating, printing) then it is possible to broaden the choice of substrates. This choice will then be made rather depending on the stability of the metal at the operating potential of the electrodes which are associated therewith and upon contact with the electrolytes. However, depending on the synthetic route used to produce the nanoparticles, more or less aggressive heat treatments must be carried out for the consolidation and possible recrystallisation of the nanopowders: this aspect will be further explored in section 5 below.

In all cases, a consolidation heat treatment is necessary to obtain these mesoporous electrodes. It is essential that the substrate capable of acting as an electric current collector can withstand these heat treatments without being oxidised. Several strategies can be used.

When the nanopowders deposited on the substrate by inking are amorphous and/or with numerous point defects, it is necessary to carry out a heat treatment which, in addition to consolidation, will also allow to recrystallise the material in the correct crystalline phase with the correct stoichiometry. For this purpose, it is generally necessary to carry out heat treatments at temperatures between 50° and 700° C. The substrate will then have to withstand this type of heat treatment, and it is necessary to use materials that withstand these high temperature treatments. Strips of stainless steel, titanium, molybdenum, tungsten, tantalum, chromium, as well as their alloys can for example be used.

When the nanopowders and/or agglomerates are crystallised, obtained by hydro-solvothermal synthesis with the correct phase and crystalline structure, then it is possible to use consolidation heat treatments under a controlled atmosphere, which will allow to use less noble substrates such as nickel, copper, aluminium, and due to the very small size of the primary particles obtained by hydrothermal synthesis, it will also be possible to reduce the temperature and/or the duration of the consolidation heat treatment to values close to 350-500° C., which also allows a wider choice of substrates. However, these less noble substrates must withstand the heat treatment allowing to remove the organic additives possibly contained in the suspension of nanoparticles used such as ligands, stabilisers, binders or residual organic solvents (debinding), this heat treatment being advantageously carried out under an oxidising atmosphere.

It is also possible that pseudo-hydrothermal syntheses result in amorphous nanoparticles which will need to be recrystallised later.

These substrates capable of acting as an electric current collector can optionally be covered with a thin film of conductive oxide. This oxide may have the same composition as the electrode. These thin films can be produced by sol-gel. This oxide-based interface allows to limit the corrosion of the substrate and ensures a better attachment base for the electrode with the substrate.

With regard to the operating conditions within the battery cell, it should be noted first of all that in the batteries using porous electrodes according to the invention, the liquid electrolytes which impregnate the porous electrode are in direct contact with the substrate capable of acting as a current collector. However, when these electrolytes are in contact with substrates capable of acting as a current collector, that is to say substrates which are metallic and polarised at potentials which are very anodic for the cathode and very cathodic for the anode, these electrolytes are capable of inducing a dissolution of the current collector. These parasitic reactions can degrade the battery life and accelerate its self-discharge. To avoid this, substrates capable of acting as a current collector such as aluminium current collectors are used at the cathode in all lithium-ion batteries. Aluminium has this peculiarity of being anodised at very anodic potentials, and the oxide layer thus formed at its surface protects it from the dissolution. However, aluminium has a melting temperature close to 600° C. and cannot be used for the manufacture of batteries according to the invention, if the electrode consolidation treatments may melt the current collector.

Thus, to avoid parasitic reactions that can degrade the life of the battery and accelerate its self-discharge, a titanium strip is advantageously used as a current collector at the cathode. When operating the battery, the titanium strip, such as aluminium, will be anodised and its oxide layer will prevent any parasitic reactions of titanium dissolution in contact with the liquid electrolyte. In addition, as titanium has a much higher melting point than aluminium, fully solid electrodes according to the invention can be made directly on this type of strip.

The use of these massive materials, in particular titanium strips, also allows to protect the cutting edges of the battery electrodes from corrosion phenomena. The use of copper strips advantageously allows to protect the cutting edges of the battery anodes from corrosion phenomena.

Stainless steel can also be used as a current collector, in particular when containing titanium or aluminium as an alloy element, or when it has a thin layer of protective oxide.

Other substrates serving as a current collector can be used such as less noble metal strips covered with a protective coating, allowing to avoid the possible dissolution of these strips induced by the presence of electrolytes at their contact.

These less noble metal strips can be Copper, Nickel or metal alloy strips such as stainless steel strips, Fe—Ni alloy, Be—Ni—Cr alloy, Ni—Cr alloy or Ni—Ti alloy strips.

The coating that can be used to protect the substrates serving as current collectors may be of different natures. The coating may be:

a thin layer obtained by the sol-gel method of the same material as that of the electrode. The absence of porosity in this film allows to prevent contacts between the electrolyte and the metal current collector;

a thin layer obtained by vacuum deposition, in particular by Physical Vapour Deposition (abbreviated PVD) or by Chemical Vapour Deposition (abbreviated CVD), of the same material as that of the electrode;

a thin metal layer, which is dense, flawless, such as a thin metal layer of gold, titanium, platinum, palladium, tungsten or molybdenum. These metals can be used to protect current collectors as they have good conduction properties and can withstand heat treatments during the subsequent electrode manufacturing method. This layer can in particular be produced by electrochemistry, PVD, CVD, evaporation, ALD;

a thin carbon layer such as diamond, graphite carbon, deposited by ALD, PVD, CVD or inking of a sol-gel solution allowing to obtain after heat treatment a carbon-doped inorganic phase to make it conductive, a layer of conductive or semiconductor oxides, such as an ITO (indium-tin oxide) layer only deposited on the cathode substrate because the oxides are reduced at low potentials;

a layer of conductive nitrides such as a TiN layer only deposited on the cathode substrate because nitrides insert lithium at low potentials.

The coating that can be used to protect the substrates serving as current collectors must be electronically conductive so as not to interfere with the operation of the electrode subsequently deposited on this coating, by making it too resistive.

In general, in order not to impact too heavily the operation of the battery cells, the maximum dissolution currents measured on the substrates which can act as a current collector, at the operating potentials of the electrodes, expressed in $\mu A/cm^2$, must be 1000 times lower than the surface capacities of the electrodes expressed in $\mu Ah/cm^2$. When seeking to increase the thickness of the electrodes, it is observed that the shrinkage generated by consolidation can lead either to a cracking of the layers or to a shear stress at the interface between the substrate (which has a fixed dimension) and the ceramic electrode. When this shear stress exceeds a threshold, the layer detaches from its substrate.

To avoid this phenomenon, it is preferable to increase the thickness of the electrodes by a succession of deposition—sintering operations. This first variant of the first embodiment of the deposition of the layers gives a good result, but is not very productive. Alternatively, in a second variant, layers of greater thickness are deposited on both faces of a perforated substrate. The perforations must be of sufficient diameter so that the two layers of the front and back are in contact at the perforations. Thus, during consolidation, the nanoparticles and/or agglomerates of nanoparticles of electrode material in contact through the perforations in the substrate are welded together, forming an attachment point (welding point between the depositions of the two faces). This limits the loss of adhesion of the layers to the substrate during the consolidation steps.

To avoid this phenomenon, that is to say in order to increase the deposition thicknesses while limiting or eliminating the appearance of cracks, it is possible to add binders, dispersants. These additives and organic solvents can be eliminated by heat treatment, preferably under oxidising atmosphere, such as by debinding, during a sintering treatment or during a heat treatment carried out prior to the sintering treatment.

3.2 Intermediate Substrate

According to a second embodiment, the electrode layers are not deposited on a substrate capable of acting as an electric current collector, but on an intermediate, temporary substrate. In particular, it is possible to deposit, from suspensions that are more concentrated in nanoparticles and/or agglomerates of nanoparticles (that is to say less fluid, preferably pasty), fairly thick layers (called "green sheet"). These thick layers are deposited for example by a coating method, preferably by a doctor blade coating (a technique known under the term "tape casting") or a slot-die coating. Said intermediate substrate may be a polymeric sheet, for example poly(ethylene terephthalate), abbreviated PET. During drying, these layers do not crack, in particular when drying occurs after the separation of the layer obtained in step (b) from its intermediate substrate. For consolidation by heat treatment (and preferably already for drying) they can be detached from their substrate; plates are thus obtained after cutting electrodes called "raw" electrodes which after calcination heat treatment and partial sintering will give mesoporous and self-supporting ceramic plates.

A stack of three layers is then made, namely two plates of electrodes of the same polarity separated by an electrically conductive sheet capable of acting as an electric current collector, such as a metal sheet or a graphite sheet. This stack is then assembled by a thermomechanical treatment, comprising a pressing and a heat treatment, preferably carried out simultaneously. Alternatively, to facilitate gluing between the ceramic plates and the metal sheet, the interface may be coated with a layer allowing an electronically conductive gluing. This layer can be a sol-gel layer (preferably of the type allowing the chemical composition of the electrodes to be obtained after heat treatment) possibly loaded with particles of an electronically conductive material, which will make a ceramic weld between the mesoporous electrode and the metal sheet. This layer can also consist of a thin layer of non-sintered electrode nanoparticles, or of a thin layer of a conductive glue (loaded with graphite particles for example), or else a metallic layer of a metal having a low melting point.

When said electrically conductive sheet is metallic, it is preferably a rolled sheet, that is to say obtained by rolling. The rolling may optionally be followed by a final annealing, which can be a (total or partial) softening or recrystallisation annealing, depending on the terminology of metallurgy. It is also possible to use an electrochemically deposited sheet, for example an electrodeposited copper sheet or an electrodeposited nickel sheet.

In any case, a ceramic electrode is obtained, without organic binder, which is mesoporous, located on either side of a metal substrate serving as an electronic current collector.

4. Deposition of the Layers of Active Material P

In general, and as has already been mentioned, the electrodes according to the invention can be manufactured from suspensions of nanoparticles, using known coating techniques. These techniques that can be used are the same printing and coating techniques as those presented above in the subchapter entitled "Preparation of suspensions of nanoparticles."

For all these techniques, it is advantageous for the dry extract of the suspension to be greater than 20%, and preferably greater than 40%; this decreases the risk of cracking when drying. Electrophoresis can also be used.

In a first embodiment, the method according to the invention advantageously uses the electrophoresis of suspensions of nanoparticles as a technique for depositing porous, preferably mesoporous, electrode layers. The method for depositing layers of electrodes from a suspension of nanoparticles is known as such (see for example EP 2 774 194 B1). The substrate can be metallic, for example a metallic sheet. The substrate serving as a current collector within the batteries using porous electrodes according to the invention is preferably selected from strips of titanium, copper, stainless steel or molybdenum.

For example, a sheet of stainless steel with a thickness of 5 $\mu$m can be used. The metal sheet may be coated with a layer of noble metal, in particular selected from gold, platinum, palladium, titanium or alloys predominantly containing at least one or more of these metals, or with a layer of ITO type conductive material (which has the advantage of also acting as a diffusion barrier).

In a particular embodiment, a layer, preferably a thin layer, of an electrode material is deposited on the metal layer; this deposition must be very thin (typically a few tens of nanometres, and more generally comprised between 10 nm and 100 nm). It can be carried out by a sol-gel method. For example, $LiMn_2O_4$ can be used for a porous $LiMn_2O_4$ cathode.

For electrophoresis to take place, a counter electrode is placed in the suspension and a voltage is applied between the conductive substrate and said counter electrode.

In an advantageous embodiment, the electrophoretic deposition of the aggregates or agglomerates of nanoparticles is carried out by galvanostatic electrodeposition in pulsed mode; high frequency current pulses are applied, this avoids the formation of bubbles on the surface of the deposited layers and the variations of the electric field in the suspension during the deposition. The thickness of the layer thus deposited by electrophoresis, preferably by galvanostatic electrodeposition in pulsed mode is advantageously less than 10 $\mu$m, preferably less than 8 $\mu$m, and is even more preferably between 1 $\mu$m and 6 $\mu$m.

In another embodiment, aggregates or agglomerates of nanoparticles can be deposited by the dip-coating method, regardless of the chemical nature of the nanoparticles used. This deposition method is preferred when the nanoparticles used have little or no electric charge. In order to obtain a layer of the desired thickness, the step of depositing the aggregates or agglomerates of nanoparticles by dip-coating followed by the step of drying the resulting layer are repeated as necessary. In order to increase the thickness of the layers free of cracks, it is advantageous to use in the colloidal suspension or the deposited paste, at least one organic additive such as ligands, stabilisers, thickeners, binders or residual organic solvents.

Although this succession of dip-coating/drying steps is time consuming, the dip-coating deposition method is a method which is simple, safe, easy to implement, to industrialise and allowing to obtain a homogeneous and compact final layer.

5. Consolidation Treatment of the Deposited Layers

The consolidation treatment is applied to the electrode layer.

The deposited layers must be dried; drying must not induce the formation of cracks. For this reason, it is preferred to carry it out under controlled humidity and temperature conditions or to use, to produce the porous layer, colloidal suspensions and/or pastes comprising, in addition to aggregates or agglomerates of monodisperse primary nanoparticles, at least one electrode active material P according to the invention, organic additives such as ligands, stabilisers, thickeners, binders or residual organic solvents.

The dried layers can be consolidated by a pressing and/or heating step (heat treatment). In a very advantageous embodiment of the invention, this treatment leads to a partial coalescence of the primary nanoparticles in the aggregates, or agglomerates, and between neighbouring aggregates or agglomerates; this phenomenon is called "necking" or "neck formation." It is characterised by the partial coalescence of two particles in contact, which remain separate but connected by a (constricted) neck. Lithium ions and electrons are movable within these necks and can diffuse from particle to particle without encountering grain boundaries. The nanoparticles weld together to ensure the conduction of electrons from one particle to another. Thus, a three-dimensional network of interconnected particles with high ionic mobility and electronic conduction is formed; this network includes pores, preferably mesopores where the notion of particle disappears after heat treatment.

The temperature necessary to obtain "necking" depends on the material; taking into account the diffusive nature of the phenomenon which leads to necking, the duration of the treatment depends on the temperature. This method can be called sintering; depending on its duration and temperature, a more or less pronounced coalescence (necking) is obtained, which has repercussions on the porosity. It is thus possible to go down to 30% (or even 25%) of porosity while maintaining a perfectly homogeneous channel size.

The heat treatment can also be used to eliminate the organic additives possibly contained in the suspension of nanoparticles used, such as ligands, stabilisers, binders or residual organic solvents. According to another variant, an additional heat treatment, under an oxidising atmosphere, can be carried out to remove these organic additives possibly contained in the suspension of nanoparticles used. This additional heat treatment is advantageously carried out before the consolidation treatment of step c) allowing to obtain a porous, preferably mesoporous, layer.

6. Deposition of the Coating of Electronically Conductive Material

According to an essential feature of the present invention, a coating of an electronically conductive material is deposited on and inside the pores of said porous layer so as to obtain the porous electrode of the assembly according to the invention.

Indeed, as explained above, the method according to the invention, which necessarily involves a step of depositing agglomerated nanoparticles of electrode material (active material), causes the nanoparticles to "weld" naturally to each other to generate, after consolidation such as annealing, a porous, rigid, three-dimensional structure, without organic binder; this porous, preferably mesoporous, layer, is perfectly adapted to the application of a surface treatment, by gas or liquid, which goes deep into the open porous structure of the layer.

Very advantageously, this deposition is carried out by a technique allowing an encapsulating coating (also called "conformal deposition"), that is to say a deposition which faithfully reproduces the atomic topography of the substrate on which it is applied, and which goes deep into the open porosity network of the layer. Said electronically conductive material may be carbon.

The techniques of ALD (Atomic Layer Deposition) or CSD (Chemical Solution Deposition), known as such, may be suitable. They can be implemented on the porous layers after manufacture, before the deposition of the separator particles and before the assembly of the cell. The ALD deposition technique is carried out layer by layer, by a cyclic method, and allows to produce an encapsulating coating which faithfully reproduces the topography of the substrate; the coating lines the entire surface of the electrodes. This encapsulating coating typically has a thickness comprised between 1 nm and 5 nm.

The deposition by ALD is carried out at a temperature typically comprised between 100° C. and 300° C. It is important that the layers are free from organic materials: they must not include any organic binder, any residues of stabilising ligands used to stabilise the suspension must have been removed by purification of the suspension and/or during the heat treatment of the layer after drying. Indeed, at the temperature of the ALD deposition, the organic materials forming the organic binder (for example the polymers contained in the electrodes produced by ink tape casting) risk decomposing and will pollute the ALD reactor. Moreover, the presence of residual polymers in contact with the electrode active material particles can prevent the ALD coating from encapsulating all the particle surfaces, which impairs its effectiveness.

The CSD deposition technique also allows to produce an encapsulating coating with a precursor of the electronically conductive material which faithfully reproduces the topography of the substrate; it lines the entire surface of the electrodes. This encapsulating coating typically has a thickness of less than 5 nm, preferably comprised between 1 nm and 5 nm. It must then be transformed into an electronically conductive material. In the case of a carbon precursor, this will be done by pyrolysis, preferably under inert gas (such as nitrogen).

In this variant of depositing a nanolayer of electronically conductive material, it is preferable that the diameter $D_{50}$ of the primary particles of electrode material is at least 10 nm in order to prevent the conductive layer from blocking the open porosity of the layer.

7. Production of the Separator (Layer of Inorganic Material E) on the Porous Electrode A layer of at least one inorganic material E, from suspensions of nanoparticles of inorganic material E, is deposited on the porous, preferably mesoporous, electrode comprising a coating of an electronically conductive material, preferably after drying, using known coating techniques as indicated in paragraph 4 above. The method for depositing porous inorganic layers from a suspension of nanoparticles is known as such (see for example WO 2019/215411 A1).

In one embodiment, the material used for the manufacture of porous layers which can serve as a separator according to the invention is selected from inorganic materials with a low melting point, electronic insulators and which are stable in contact with the electrodes during the heat pressing steps. The more refractory the materials, the more it will be necessary to heat at the electrode/electrolytic separator interfaces, at high temperatures thus risking modifying the interfaces with the electrode materials, in particular by interdiffusion, which generates parasitic reactions and creates depletion layers whose electrochemical properties differ from those found in the same material at a greater depth from the interface. Materials comprising lithium are preferred because they prevent or even eliminate these lithium depletion phenomena.

The material used for the manufacture of porous inorganic layers according to the invention can be an ionic conductive material such as a solid electrolyte comprising lithium in order to avoid the formation of lithium depletion areas at the electrode/electrolytic separator interfaces. The inorganic material E advantageously comprises an electronically insulating material, preferably chosen from the materials selected from the group formed of lithiated phosphates, preferably selected from: lithiated phosphates of the NaSICON type, $Li_3PO_4$; $LiPO_3$; $Li_3Al_{0.4}Sc_{1.6}(PO_4)_3$ called "LASP"; $Li_{1+x}Zr_{2-x}Ca_x(PO_4)_3$ with $0 \leq x \leq 0.25$; $Li_{1+2x}Zr_{2-x}Ca_x(PO_4)_3$ with $0 \leq x \leq 0.25$ such as $Li_{1.2}Zr_{1.9}Ca_{0.1}(PO_4)_3$ or $Li_{1.4}Zr_{1.8}Ca_{0.2}(PO_4)_3$; $LiZr_2(PO_4)_3$; $Li_{1+3x}Zr_2(P_{1-x}Si_xO_4)_3$ with $1.8 \leq x \leq 2.3$; $Li_{1+6x}Zr_2(P_{1-x}B_xO_4)_3$ with $0 \leq x \leq 0.25$; $Li_3(Sc_{2-x}M_x)(PO_4)_3$ with M=Al or Y and $0 \leq x \leq 1$; $Li_{1+x}M_x(Sc)_{2-x}(PO_4)_3$ with M=Al, Y, Ga or a mixture of these three elements and $0 \leq x \leq 0.8$; $Li_{1+x}M_x(Ga_{1-y}Sc_y)_{2-x}(PO_4)_3$ with $0 \leq x \leq 0.8$; $0 \leq y \leq 1$ and M=Al and/or Y; $Li_{1+x}M_x(Ga)_{2-x}(PO_4)_3$ with M=Al and/or Y and $0 \leq x \leq 0.8$; $Li_{1+x}Al_xTi_{2-x}(PO_4)_3$ with $0 \leq x \leq 1$ called "LATP"; or $Li_{1+x}Al_xGe_{2-x}(PO_4)_3$ with $0 \leq x \leq 1$ called "LAGP"; or $Li_{1+x+z}M_x(Ge_{1-y}Ti_y)_{2-x}Si_zP_{3-z}O_{12}$ with $0 \leq x \leq 0.8$ and $0 \leq y \leq 1.0$ and $0 \leq z \leq 0.6$ and M=Al, Ga or Y or a mixture of two or three of these elements; $Li_{3+y}(SC_{2-x}M_x)Q_yP_{3-y}O_{12}$ with M=Al and/or Y and Q=Si and/or Se, $0 \leq x \leq 0.8$ and $0 \leq y \leq 1$; or $Li_{1-x-y}M_xSC_{2-x}Q_yP_{3-y}O_{12}$ with M=Al, Y, Ga or a mixture of these three elements and Q=Si and/or Se, $0 \leq x \leq 0.8$ and $0 \leq y \leq 1$; or $Li_{1+x+y+z}M_x(Ga_{1-y}Sc_y)_{2-x}Q_zP_{3-z}O_{12}$ with $0 \leq x \leq 0.8$, $0 \leq y \leq 1$, $0 \leq z \leq 0.6$ with M=Al and/or Y and Q=Si and/or Se; or $Li_{1+x}Zr_{2-x}B_x(PO_4)_3$ with $0 \leq x \leq 0.25$; or $Li_{1+x}M^3_xM_{2-x}P_3O_{12}$ with $0 \leq x \leq 1$ and $M^3$=Cr, V, Ca, B, Mg, Bi and/or Mo, M=Sc, Sn, Zr, Hf, Se or Si, or a mixture of these elements. $Li_3PO_4$ is particularly preferred.

This inorganic layer is a porous, preferably mesoporous, ceramic film which performs the function of electrolytic separation. The ceramic nanoparticles used to manufacture the separator of the assembly according to the invention must be electrochemically stable in contact with the electrodes and be electronically insulating, and preferably conductive of lithium ions. Depositing this inorganic layer (mesoporous ceramic film) allows to reduce the thickness of the electrolytic film. This layer has excellent mechanical properties. This reduction in thickness increases the volume energy density of the batteries.

The completely ceramic and/or glass-ceramic nature of this porous inorganic layer, free from organic elements, allows to guarantee an excellent mechanical strength, perfect wetting by liquid electrolytes, even by ionic liquids at room temperature, and also ensures the operation of battery cells in very wide temperature ranges (no risk of melting and/or breakage of the separator).

The production of such a porous inorganic layer, that is to say such a separator, on the porous electrodes remains very difficult to achieve. Indeed, the performance of the porous electrodes according to the invention comes in part from the fact that they are covered on the surface by a coating of an electronically conductive material, such as carbon. However, the depositions of agglomerates of inorganic nanoparticles E serving to ensure the electrolytic separation function are, after deposition, rich in organic materials. These organic materials being in the solvent adsorbed on the surface of the nanoparticles as well as in the organic stabilisers used in the formulation of the suspension of inorganic nanoparticles E. Thus, before impregnating the assembly consisting of a porous electrode and a separator according to the invention, these organic residues should be removed from the separator. For this purpose, it is necessary to carry out calcination treatments. These calcination treatments are carried out by annealing under air in order to transform these organics into $CO_2$ and eliminate them. However, to guarantee the performance of the porous electrode associated with this ceramic separator, it is essential that the coating of electronically conductive material, such as the carbon coating present on the surface of the porous electrodes, is not removed by the calcination treatment of the organics. For this purpose, the applicant has identified treatment conditions which allow to remove the organics while maintaining the coating of electronically conductive material, such as the carbon coating on the porous electrode, without there being any carbon deposition in the separator which could harm the electrical insulation of the cell, in particular its self-discharge.

This heat treatment is carried out under air, at a moderate temperature, in order to allow the removal of the organics contained in the electrolytic separator deposition in the form of $CO_2$ while maintaining the coating of electronically conductive material, such as the carbon coating present at the surface of the porous electrodes. For this purpose, a heat treatment at less than 500° C. and preferably at a temperature comprised between approximately 250° C. and approximately 450° C., and optimally) approximately 400° C., is carried out.

After heat treatment, an assembly consisting of a porous electrode and a separator according to the invention is obtained.

8. Impregnation of the Assembly with an Electrolyte in Order to Obtain a Functional Member of a Battery According to a first embodiment of the invention, the assembly is impregnated with a polymer containing lithium salts, and which is therefore an ionic conductor, the ion species transported being lithium ions.

According to a second embodiment of the invention, the assembly is impregnated with a liquid electrolyte; it may be, for example, an ionic liquid or an aprotic solvent wherein one or more lithium salts have been dissolved. It is also possible to use a poly(ionic liquid) (abbreviated PIL).

More specifically, the assembly according to the invention (before its impregnation) does not contain organic compounds, and this absence of organic compounds coupled with a mesoporous structure promotes wetting by an electrolyte which conducts lithium ions. This electrolyte can then be selected without distinction from the group formed of: an electrolyte composed of at least one aprotic solvent and of at least one lithium salt, an electrolyte composed of at least one ionic liquid or poly(ionic liquid) and at least one lithium salt, a mixture of aprotic solvents and ionic liquids or poly(ionic liquids) and lithium salts, an ionically conductive polymer containing at least one lithium salt, or else a polymer made ionically conductive by adding at least one lithium salt. Said polymer is advantageously selected from the group formed of poly(ethylene oxide) (commonly abbreviated PEO), poly(propylene oxide), polydimethylsiloxane (commonly abbreviated PDMS), polyacrylonitrile (commonly abbreviated PAN), poly(methyl methacrylate) (commonly abbreviated PMMA), poly(vinyl chloride) (commonly abbreviated PVC), poly(vinylidene fluoride) (commonly abbreviated PVDF), PVDF-hexafluoropropylene.

Said polymer, whether or not containing lithium salts, is typically solid at room temperature and can be melted and this molten phase can then be impregnated into the mesoporosity of the assembly. Once cooled, an assembly comprising an electrode and a solid electrolyte is obtained.

This assembly comprising an electrode and a solid electrolyte can be used in several ways to produce elementary battery cells.

9. Use of the Assembly Comprising a Porous Electrode and a Solid Electrolyte to Produce Elementary Battery Cells As indicated above, the assembly according to the invention can be impregnated with a molten phase comprising an ionically conductive polymer, and optionally lithium salts. Once cooled, an assembly comprising a porous electrode for an electrode and a solid electrolyte is obtained. This assembly comprising an electrode and a solid electrolyte can be used in several ways to produce elementary battery cells, and, ultimately, batteries.

This assembly comprising an electrode and a solid electrolyte can be attached:

to another assembly comprising an electrode and a solid electrolyte, or to a dense electrode, or to a porous electrode previously impregnated with a polymer, or to a dense electrode previously covered with a layer of electrolyte, or a porous electrode previously covered with a porous electrode, whose assembly is impregnated with a polymer.

The stacks obtained are then thermocompressed so as to assemble the elementary cells of the batteries. During thermocompression, the impregnated ionic conductive polymer will soften and allow the welding to be made between the assembly comprising an electrode and a solid electrolyte and the subsystem to which it is attached. To make the welding reliable, during thermocompression, between the assembly comprising an electrode and a solid electrolyte and the subsystem to which it is attached, it is also possible to deposit on the assembly comprising an electrode and a solid electrolyte, and/or on the subsystem to which it will be attached, a thin layer of the same ionically conductive polymer used to impregnate the assembly according to the invention. This allows the operating temperature range of the final battery to be increased.

For the same purpose, it is also possible to deposit on the assembly comprising an electrode and a solid electrolyte, and/or on the subsystem to which it will be attached, a thin layer of core-shell particles, the core of which is made from the same inorganic material E as that used to make the separator of the assembly according to the invention, and the shell is made from the same ionic conductive polymer used during the impregnation of the assembly according to the invention. This allows to increase the mechanical properties of the separator as well as its adhesion to the subsystem to which it is attached.

The assembly consisting of a porous positive electrode and a separator according to the invention and impregnated with an ionic conductive polymer, is particularly well adapted to the production of very high energy density battery cells using negative metallic lithium electrodes. Indeed, to use negative electrodes made of metallic lithium it is imperative that the cell is fully solid, devoid of liquid electrolyte and/or pockets of liquid electrolyte trapped in polymers or other phases. These liquid phases are privileged areas for precipitation of metallic lithium.

In another embodiment, it is also possible to attach and then assemble the assembly consisting of a porous electrode and a separator according to the invention and impregnated with an ionic conductive polymer comprising or not lithium salts:

with a porous electrode of opposite sign, or with a porous electrode of opposite sign covered with a porous separator, or with an assembly consisting of a porous electrode and a separator according to the invention.

The assembly of the resulting stack must be carried out by thermopressing. In the event that there is no organic material to make the connection between the different subassemblies, the pressing temperatures should be relatively high and preferably greater than 400° C. Also, these treatments should be carried out under an inert atmosphere or under vacuum to avoid altering the coating of electronically conductive material present on the porous electrode of the assembly according to the invention. The resulting assembly can be impregnated subsequently with an electrolyte, whether solid or liquid. Impregnation with a solid electrolyte, such as an ionic conductive polymer comprising lithium salts without liquid phase, allows to produce batteries operating with negative electrodes with low insertion potential without forming lithium dendrites.

EXAMPLES

Example 1: Production of a Porous Positive Electrode Based on $LiMn_2O_4$

A suspension of $LiMn_2O_4$ nanoparticles was prepared by hydrothermal synthesis according to the method described in the article by Liddle and al. titled "*A new one pot hydro-thermal synthesis and electrochemical characterisation of $Li_{1+x}Mn_{2-y}O_4$ spinel structured compounds*", Energy &

Environmental Science (2010) vol. 3, page 1339-1346:14.85 g of LiOH, $H_2O$ were dissolved in 500 ml of water. 43.1 g of $KM_nO_4$ was added to this solution and this liquid phase was poured into an autoclave. With stirring, 28 ml of isobutyraldehyde, 25 g/l of 40 000 g/mol polyvinylpyrroli-done (PVP), and water were added until a total volume of 3.54 I was reached. The autoclave was then heated to 180° C. and maintained at that temperature for 6 hours. After cooling slowly, a black precipitate suspended in the solvent was obtained. This precipitate was subjected to a succession of steps of centrifugation—redispersion in water, until an aggregated suspension is obtained. The obtained aggregates consisted of aggregated primary particles 10 to 20 nm in size. The aggregates obtained had a spherical shape and an average diameter of about 150 nm. The amount of PVP added to the reaction medium allowed to adjust the size and shape of the agglomerates obtained.

About 10 to 15 wt % of 360 000 g/mol polyvinylpyrroli-done (PVP) was then added to the aqueous suspension of aggregates. The water was then evaporated until the aqueous suspension of aggregates had a dry extract of 10%. The ink thus obtained was then applied to a stainless steel strip (316 L) with a thickness of 5 μm. The deposition obtained was then dried in a temperature and humidity controlled oven in order to prevent the formation of cracks during drying. This resulted in a deposition approximately 10 μm thick.

The deposition obtained was then consolidated at 600° C. for 1 hour under air in order to weld the nanoparticles together, to improve adhesion to the substrate and to com-plete the recrystallisation of $LiMn_2O_4$. The porous film obtained has an open porosity of approximately 45% by volume with pores having a size comprised between 10 nm to 20 nm.

The porous film was then impregnated with an aqueous solution of sucrose at approximately 20 g/I, then was annealed at 400° C. under $N_2$ in order to obtain a carbon nanocoating over the entire accessible surface of the porous film.

Example 2: Manufacture of a Porous Electrode and Integrated Electrolytic Separator Assembly Using the Electrode According to Example 1

A cathode was produced according to Example 1. This electrode was covered with a porous layer from a suspension of $Li_3PO_4$ nanoparticles as indicated below.

Making a Suspension of $Li_3PO_4$ Nanoparticles

Two solutions were prepared. 11.44 g of $CH_3COOLi$, $2H_2O$ were dissolved in 112 ml of water, then 56 ml of water were added with vigorous stirring to the medium in order to obtain a solution A. 4.0584 g of $H_3PO_4$ were diluted in 105.6 ml of water, then 45.6 ml of ethanol were added to this solution in order to obtain a second solution called herein-after solution B. Solution B was then added, with vigorous stirring, to solution A.

The solution obtained, which was perfectly clear after the bubbles formed during mixing had disappeared, was added to 1.2 litres of acetone under the action of an Ultraturrax™ type homogeniser in order to homogenise the medium. A white precipitation suspended in the liquid phase was imme-diately observed.

The reaction medium was homogenised for 5 minutes then was maintained for 10 minutes with magnetic stirring. It was left to settle for 1 to 2 hours. The supernatant was removed then the remaining suspension was centrifuged for 10 minutes at 6000 rpm. Then 300 ml of water were added to resuspend the precipitate (use of a sonotrode, magnetic stirring). With vigorous stirring, 125 ml of a 100 g/l sodium tripolyphosphate solution were added to the colloidal suspension thus obtained. The suspension has thus become more stable. The suspension was then sonicated using a sonotrode. The suspension was then centrifuged for 15 minutes at 8000 rpm. The pellet was then redispersed in 150 ml of water. The suspension obtained was then centrifuged again for 15 minutes at 8000 rpm and the pellets obtained redispersed in 300 ml of ethanol in order to obtain a suspension suitable for carrying out an electrophoretic deposition.

Agglomerates of about 100 nm consisting of primary $Li_3PO_4$ particles of 15 nm were thus obtained in suspension in ethanol, with Bis(Monoacylglycero)Phosphate (abbreviated BMP) as stabiliser.

Producing on the Previously Developed Cathode a Porous Layer from the Suspension of $Li_3PO_4$ Nanoparticles Previously Described A thin porous layer of $Li_3PO_4$ was then deposited by dip-coating in the suspension of $Li_3PO_4$ nanoparticles previously obtained, containing 20 g/L of agglomerated nanoparticles, with a deposition speed of approximately 10 mm/s. This produces a layer approximately 3 μm to 4 μm thick on the electrode. The layer was then dried in air at 120° C. then a calcination treatment at approximately 350° C. to 400° C. for 60 minutes was carried out on this previously dried layer in order to remove all traces of organic residues from the separator while retaining the carbon nanocoating of the porous electrode.

The invention claimed is:

1. A method for manufacturing an electrochemical device having an assembly that includes a porous electrode and a porous separator, the porous electrode having a porous layer free of binder, a porosity of between 25% and 50% by volume, and pores having an average diameter of less than 50 nm, the porous separator including a porous inorganic layer free of binder deposited on the porous electrode, the porous inorganic layer having a porosity of between 25% and 50% by volume and pores having an average diameter of less than 50 nm, the manufacturing method comprising:

(a) providing a substrate, a first colloidal suspension or a paste comprising aggregates or agglomerates of monodisperse primary nanoparticles of at least one active electrode material, having an average primary diameter of between 2 nm and 60 nm, said aggregates or agglomerates having an average diameter of between 100 nm and 200 nm, and a second colloidal suspension comprising aggregates or agglomerates of nanoparticles of at least one inorganic material, having an average primary diameter of between 2 nm and 60 nm, said aggregates or agglomerates having an average diameter of between 100 nm and 200 nm, wherein the substrate is a substrate acting as an electric current collector or an intermediate substrate, (b) depositing a layer from said first colloidal suspension or said paste on at least one face of said substrate using one of: electrophoresis, ink-jet printing, flexographic printing, doctor blade coating, roll coating, curtain coating, dip-coating, and extrusion slot-die coating;

(c) drying said deposited layer before or after separating said deposited layer from the intermediate substrate, then, heat treating the dried layer under an oxidising atmosphere, then consolidating the heat treated layer by pressing and/or heating to obtain a mesoporous, inorganic layer;

(d) depositing a coating of an electronically conductive material on and inside the pores of said mesoporous, inorganic layer to form said porous electrode;

(e) depositing a porous inorganic layer from the second colloidal suspension on said porous electrode by one of: electrophoresis, ink-jet printing, flexographic printing, roll coating, curtain coating, doctor blade coating, extrusion slot-die coating, and dip-coating, (f) drying the deposited porous inorganic layer under an air flow, and then heat treating the dried porous inorganic layer at a temperature below 400° C. to obtain said assembly.

2. The method of claim 1, wherein said mesoporous, inorganic layer has a specific surface of between 10 $m^2$/g and 500 $m^2$/g.

3. The method of claim 1, wherein said mesoporous, inorganic layer has a thickness of between 4 μm and 400 μm.

4. The method of claim 1, wherein:
   when said substrate comprises an intermediate substrate, said deposition layer is separated before or after drying from said intermediate substrate to form a porous plate.

5. The method of claim 4, wherein when a colloidal suspension or paste comprises organic additives:
   the dried deposited porous inorganic layer is heat treated under an oxidising atmosphere, or
   said porous plate is heat treated under an oxidising atmosphere.

6. The method of claim 1, wherein said deposited porous inorganic layer has a thickness of between 5 μm and 10 μm.

7. The method of claim 1, wherein said electronically conductive material is carbon.

8. The method of claim 1, wherein depositing said coating of electronically conductive material is carried out by atomic layer deposition or immersion in a liquid phase including a precursor of said electronically conductive material, and then transforming said precursor into an electronically conductive material.

9. The method of claim 8, wherein:
   said precursor comprises a polysaccharide, and
   transforming said precursor into the electronically conductive material is conducted by pyrolysis under an inert atmosphere.

10. The method of claim 1, wherein said at least one active electrode material is selected from the group consisting of:
   oxides $LiMn_2O_4$, $Li_{1+x}Mn_{2-x}O_4$ with $0<x<0.15$, $LiCoO_2$, $LiNiO_2$, $LiMn_{1.5}Ni_{0.5}O_4$, $LiMn_{1.5}Ni_{0.5-x}X_xO_4$ where X is selected from Al, Fe, Cr, Co, Rh, Nd, other rare earths, and where $0<x<0.1$, $LiMn_{2-x}M_xO_4$ with M=Er, Dy, Gd, Tb, Yb, Al, Y, Ni, Co, Ti, Sn, As, Mg or a mixture thereof and where $0<x<0.4$, $LiFeO_2$, $LiMn_{1/3}Ni_{1/3}Co_{1/3}O_2$, $LiNi_{0.8}Co_{0.15}Al_{0.05}O_2$, $LiAl_xMn_{2-x}O_4$ with $0≤x<0.15$, $LiNi_{1/x}Co_{1/y}Mn_{1/z}O_2$ with x+y+z=10;
   $Li_xMyO_2$ where $0.6≤y≤0.85$; $0≤x+y≤2$; and M is selected from Al, Ti, Cr, Mn, Fe, Co, Ni, Cu, Zn, Zr, Nb, Mo, Ru, Sn, and Sb or a mixture thereof; $Li_{1.20}Nb_{0.20}Mn_{0.60}O_2$;
   $Li_{1+x}Nb_yMe_zApO_2$ where Me is at least one transition metal selected from: Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs and Mt, and where $0.6<x<1$; $0<y<0.5$; $0.25≤z<1$; with A≠0 Me and A≠0 Nb, and $0≤p≤0.2$;
   $Li_xNb_{y-a}NaM_{z-b}PbO_{2-c}F_c$ where $1.2<x≤1.75$; $0≤y<0.55$; $0.1<z<1$; $0≤a<0.5$; $0≤b<1$; $0≤c<0.8$; and where M, N, and P are each at least one of the elements selected from the group consisting of Ti, Ta, V, Cr, Mn, Fe, Co, Ni, Cu, Zn, Al, Zr, Y, Mo, Ru, Rh, and Sb;

$Li_{1.25}Nb_{0.25}Mn_{0.50}O_2$; $Li_{1.3}Nb_{0.3}Mn_{0.40}O_2$;
$Li_{1.3}Nb_{0.3}Fe_{0.40}O_2$; $Li_{1.3}Nb_{0.43}Ni_{0.27}O_2$;
$Li_{1.3}Nb_{0.43}Go_{0.27}O_2$; $Li_{1.4}Nb_{0.2}Mn_{0.53}O_2$;
$Li_xNi_{0.2}Mn_{0.6}O_y$ where $0.00 \leq x \leq 1.52$; $1.07 \leq y \leq 2.4$;
$Li_{1.2}Ni_{0.2}Mn_{0.6}O_2$;
$LiNi_xCo_yMn_{1-x-y}O_2$ where $0 \leq x$ and $y \leq 0.5$; $LiNi_xCe_zCo_yMn_{1-x-y}O_2$ where $0 \leq x$ and $y \leq 0.5$ and $0 \leq z$; phosphates $LiFePO_4$, $LiMnPO_4$, $LiCoPO_4$, $LiNiPO_4$, $Li_3V_2(PO_4)_3$; $Li_2MPO_4F$ with M=Fe, Co, Ni or a mixture thereof, $LiMPO_4F$ with M=V, Fe, T or a mixture thereof; the phosphates of formula $LiMM'PO_4$, with M and M' (M≠M') selected from Fe, Mn, Ni, Co, V and where $0 < x \leq 1$;
oxyfluorides of a type $Fe_{0.9}Co_{0.1}OF$; $LiMSO_4F$ with M=Fe, Co, Ni, Mn, Zn, Mg; and
all lithiated forms of chalcogenides that include: $V_2O_5$, $V_3O_8$, $TiS_2$, titanium oxysulfides ($TiO_yS_z$ with z=2-y and $0.3 \leq y \leq 1$), tungsten oxysulfides ($WO_yS_z$ with $0.6 < y < 3$ and $0.1 < z < 2$), CuS, $CuS_2$, $Li_xV_2O_5$ with $0 < x < 2$, $Li_xV_3O_8$ with $0 < x \leq 1.7$, $Li_xTiS_2$ with $0 < x \leq 1$, titanium and lithium oxysulfides with $Li_xTiO_yS_z$ with z=2-y, $0.3 \leq y \leq 1$ and $0 < x \leq 1$, $Li_xWO_yS_z$ with z=2-y, $0.3 < y \leq 1$ and $0 < x \leq 1$, $Li_xCuS$ with $0 < x \leq 1$, $Li_xCuS_2$ with $0 < x \leq 1$.

11. The method of claim 1, wherein said at least one active electrode material is selected from the group consisting of:

$Li_4Ti_5O_{12}$, $Li_4Ti_{5-x}M_xO_{12}$ where M=V, Zr, Hf, Nb, Ta and $0 \leq x \leq 0.25$;

niobium oxides and mixed niobium oxides with titanium, germanium, cerium or tungsten, and one selected from the group consisting of:

$Nb_2O_{5\pm\delta}$, $Nb_{18}W_{16}O_{93\pm\delta}$, $Nb_{16}W_5O_{55\pm\delta}$ with $0 \leq x \leq 1$ and $0 \leq \delta \leq 2$, $LiNbO_3$, $TiNb_2O_{7\pm\delta}$, $Li_wTiNb_2O_7$ where $w \leq 0$, $Ti_{1-x}M^1_xNb_{2-y}M^2_yO_{7\pm\delta}$ or $Li_wTi_{1-x}M^1_xNb_{2-y}M^2_yO_{7\pm\delta}$ where $M^1$ and $M^2$ are each at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs and Sn, $M^1$ and $M^2$ are identical or different from each other, and where $0 \leq w \leq 5$ and $0 \leq x \leq 1$ and $0 \leq y \leq 2$ and $0 \leq \delta \leq 0.3$;

$La_xTi_{1-2x}Nb_{2+x}O_7$ where $0 < x < 0.5$;

$M_xTi_{1-2x}Nb_{2+x}O_{7\pm\delta}$, where M is at least one element selected from the group consisting of Fe, Ga, Mo, Al, B, where $0 < x \leq 0.20$ and $-0.3 \leq \delta \leq 0.3$;

$Ga_{0.10}Ti_{0.80}Nb_{2.10}O_7$; $Fe_{0.10}Ti_{0.80}Nb_{2.10}O_7$;

$M_xTi_{2-2x}Nb_{10+x}O_{29\pm\delta}$, where M is at least one element selected from the group consisting of Fe, Ga, Mo, Al, B, where $0 < x \leq 0.40$ and $-0.3 \leq \delta \leq 0.3$;

$Ti_{1-x}M^1_xNb_{2-y}M^2_yO_{7-z}M^3_z$ or $Li_wTi_{1-x}M^1_xNb_{2-y}M^2_yO_{7-z}M^3_z$ where $M^1$ and $M^2$ are each at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs and Sn, $M^1$ and $M^2$ are identical or different from each other, $M^3$ is at least one halogen, and where $0 \leq w \leq 5$ and $0 \leq x \leq 1$ and $0 \leq y \leq 2$ and $z \leq 0.3$;

$TiNb_2O_{7-z}M^3_z$ or $Li_wTiNb_2O_{7-z}M^3_z$ wherein $M^3$ is at least one halogen, selected from F, Cl, Br, I or a mixture thereof, and $0 \leq z \leq 0.3$;

$Ti_{1-x}Ge_xNb_{2-y}M^1_yO_{7\pm z}$, $Li_wTi_{1-x}Ge_xNb_{2-y}M^1_yO_{7\pm z}$, $Ti_{1-x}Ce_xNb_{2-y}M^1_yO_{7\pm z}$, $Li_wTi_{1-x}Ce_xNb_{2-y}M^1_yO_{7\pm z}$, where $M^1$ and $M^2$ are at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs and Sn, where $0 \leq w \leq 5$ and $0 \leq x \leq 1$ and $0 \leq y \leq 2$ and $z \leq 0.3$;

$Ti_{1-x}Ge_xNb_{2-y}M^1_yO_{7-z}M^2_z$, $Li_wTi_{1-x}Ge_xNb_{2-y}M^1_yO_{7-z}M^2_z$, $Ti_{1-x}Ce_xNb_{2-y}M^1_yO_{7-z}M^2_z$, $Li_wTi_{1-x}Ce_xNb_{2-y}M^1_yO_{r-z}M^2_z$, where $M^1$ and $M^2$ are each at least one element selected from the group consisting of Nb, V, Ta, Fe, Co, Ti, Bi, Sb, As, P, Cr, Mo, W, B, Na, Mg, Ca, Ba, Pb, Al, Zr, Si, Sr, K, Cs, Ce and Sn, $M^1$ and $M^2$ are identical or different from each other, and where $0 \leq w \leq 5$ and $0 \leq x \leq 1$ and $0 \leq y \leq 2$ and $z \leq 0.3$;

$TiO_2$; and

LiSiTON.

12. The method of claim 1, wherein said inorganic material comprises an electronically insulating material selected from:

$Al_2O_3$, $SiO_2$, $ZrO_2$, and/or a material selected from lithiated phosphates that includes: lithiated phosphates of an NaSICON type, $Li_3PO_4$; $LiPO_3$; $Li_3Al_{0.4}Sc_{1.6}(PO_4)_3$ called "LASP"; $Li_{1+2x}Zr_{2-x}Ca_x(PO_4)_3$ with $0 \leq x \leq 0.25$; $Li_{1+2x}Zr_{2-x}Ca_x(PO_4)_3$ with $0 \leq x \leq 0.25$ including $Li_{1-2}Zr_{1-9}Ca_{0.1}(PO_4)_3$ or $Li_{1.4}Zr_{1.8}Ca_{0.2}(PO_4)_3$; $LiZr_2(PO_4)_3$; $Li_{1+3x}Zr_2(P_{1-x}Si_xO_4)_3$ with $1.8 < x < 2.3$; $Li_{1+6x}Zr_2(P_{1-x}B_xO_4)_3$ with $0 \leq x \leq 0.25$; $Li_3(Sc_{2-x}M_x)(PO_4)_3$ with M=Al or Y and $0 \leq x \leq 1$; $Li_{1+x}M_x(Sc)_{2-x}(PO_4)_3$ with M=Al, Y, Ga or a mixture thereof and $0 \leq x \leq 0.8$;

$Li_{1-x}M_x(Ga_{1-y}SC_y)_{2-x}(PO_4)_3$ with $0 \leq x \leq 0.8$; $0 \leq y \leq 1$ and M=Al and/or Y; $Li_{1+x}M_x(Ga)_{2-x}(PO_4)_3$ with M=Al and/or Y and $0 \leq x \leq 0.8$; $Li_{1+x}Al_xTi_{2-x}(PO_4)_3$ with $0 \leq x \leq 1$ called "LATP"; or $Li_{1+x}Al_xGe_{2-x}(PO_4)_3$ with $0 \leq x \leq 1$ called "LAGP"; or $Li_{1+x+z}M_x(Ge_{1-y}Ti_y)_{2-x}Si_zP_{3-z}O_{12}$ with $0 \leq x \leq 0.8$ and $0 \leq y \leq 1.0$ and $0 \leq z \leq 0.6$ and M=Al, Ga or Y or a mixture of two or three thereof; $Li_{3+y}(SC_{2-x}M_x)Q_yP_{3-y}O_{12}$ with M=Al and/or Y and Q=Si and/or Se, $0$ $x < 0.8$ and $0 \leq y \leq 1$; or $Li_{1-x-y}M_xSC_{2-x}Q_yP_{3-y}O_{12}$ with M=Al, Y, Ga or a mixture thereof and Q=Si and/or Se, $0 \leq x \leq 0.8$ and $0 \leq y \leq 1$; or $Li_{1+x+y+z}M_x(Ga_{1-y}Sc_y)_{2-x}Q_zP_{3-z}O_{12}$ with $0 \leq x \leq 0.8$, $0 \leq y \leq 1$, $0 \leq z \leq 0.6$ with M=Al and/or Y and Q=Si and/or Se; or $Li_{1+x}Zr_{2-x}B_x(PO_4)_3$ with $0 \leq x \leq 0.25$; or $Li_{1+x}M^3_xM_{2-x}P_3O_{12}$ with $0 \leq x \leq 1$ and $M^3$=Cr, V, Ca, B, Mg, Bi and/or Mo, M=Sc, Sn, Zr, Hf, Se or Si, or a mixture thereof.

13. The method of claim 1, wherein said assembly is impregnated with an electrolyte that includes phase carrying lithium ions selected from:

an electrolyte composed of at least one aprotic solvent and at least one lithium salt;

an electrolyte composed of at least one ionic liquid or polyionic liquid and at least one lithium salt;

a mixture of at least one aprotic solvent and at least one ionic liquid or polyionic liquid and at least one lithium salt;

a polymer made ionically conductive by adding at least one lithium salt; and a polymer made ionically conductive by adding a liquid electrolyte, either in a polymer phase or a mesoporous structure, said polymer being selected from: poly(ethylene oxide), poly(propylene oxide), polydimethylsiloxane, polyacrylonitrile, poly(methyl methacrylate), poly(vinyl chloride), poly(vinylidene fluoride), and PVDF-hexafluoropropylene.

14. The method of claim 1, wherein said porous electrode is a positive porous electrode.

15. The method of claim 1, wherein said porous electrode is a negative porous electrode.

16. The method of claim 1, wherein said assembly is impregnated with an electrolyte that includes phase carrying lithium ions selected from:

an electrolyte composed of at least one aprotic solvent and at least one lithium salt;

an electrolyte composed of at least one ionic liquid or ionic polyliquid and at least one lithium salt;

a mixture of aprotic solvents and ionic liquids or ionic polyliquid and lithium salts;

a polymer made ionically conductive by adding at least one lithium salt; and a polymer made ionically conductive by adding a liquid electrolyte or ionic polyliquid, either in a polymer phase or a mesoporous structure, said polymer being selected from: poly(ethylene oxide), poly(propylene oxide), polydimethylsiloxane, polyacrylonitrile, poly(methyl methacrylate), poly(vinyl chloride), poly(vinylidene fluoride), PVDF-hexafluoropropylene.

17. A lithium-ion battery, obtained by the method of claim 1.

18. An electrochemical device, obtained by the method of claim 1.

19. The electrochemical device of claim 18, wherein the electrochemical device comprises one of: a sodium ion battery, a lithium-air battery, a fuel cell, and a photovoltaic cell.

\* \* \* \* \*